United States Patent
Brueck et al.

(10) Patent No.: US 9,288,690 B2
(45) Date of Patent: Mar. 15, 2016

(54) APPARATUS FOR CLUSTERING CELLS USING NEIGHBOR RELATIONS

(75) Inventors: Stefan Brueck, Nuremberg (DE); Armin Dekorsy, Bremen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/111,760

(22) Filed: May 19, 2011

(65) Prior Publication Data

US 2011/0294527 A1 Dec. 1, 2011

Related U.S. Application Data

(60) Provisional application No. 61/348,502, filed on May 26, 2010.

(51) Int. Cl.
*H04W 16/18* (2009.01)
*H04W 24/02* (2009.01)
*H04W 36/00* (2009.01)

(52) U.S. Cl.
CPC .......... *H04W 24/02* (2013.01); *H04W 36/0083* (2013.01)

(58) Field of Classification Search
CPC ..... H04W 84/12; H04W 24/02; H04W 84/18; H04W 24/00; H04L 41/042; H04L 41/044; H04L 5/0035
USPC ............ 455/423, 426.2, 448; 370/395.1, 389, 370/338
See application file for complete search history.

(56) References Cited

U.S. PATENT DOCUMENTS

| | | | |
|---|---|---|---|
| 5,613,198 A | 3/1997 | Ahmadi et al. |
| 5,754,959 A | 5/1998 | Ueno et al. |
| 5,898,683 A | 4/1999 | Matsumoto et al. |
| 6,650,900 B1 | 11/2003 | Chavez, Jr. et al. |
| 6,763,236 B2 | 7/2004 | Siren |
| 6,850,190 B2 | 2/2005 | Ryu et al. |
| 7,460,549 B1 | 12/2008 | Cardei et al. |
| 7,565,151 B2 | 7/2009 | Sano |
| 7,894,371 B2 | 2/2011 | Bonta et al. |
| 7,924,734 B2 | 4/2011 | Pujet et al. |
| 8,068,471 B2 | 11/2011 | Kim et al. |
| 8,155,661 B2 | 4/2012 | Gerlach et al. |
| 8,315,225 B2 | 11/2012 | Xu et al. |
| 8,320,937 B2 | 11/2012 | Bolin |

(Continued)

FOREIGN PATENT DOCUMENTS

| CN | 1870461 A | 11/2006 |
|---|---|---|
| CN | 1893308 A | 1/2007 |

(Continued)

OTHER PUBLICATIONS

3GPP TR 25.996 v.7.0.0, "Spatial channel model for multiple output (MIMO) simulations (Release 7)", Jun. 2007, pp. 1-40.

(Continued)

*Primary Examiner* — Quan M Hua
(74) *Attorney, Agent, or Firm* — Anthony R. Morris

(57) ABSTRACT

An apparatus operable in a communication system is described. The apparatus includes means for receiving a neighbor relation message from another apparatus. The apparatus also includes means for generating cluster information based on the neighbor relation message. The apparatus further includes means for transmitting the cluster information to the other apparatus.

34 Claims, 13 Drawing Sheets

(56) References Cited

U.S. PATENT DOCUMENTS

| | | | |
|---|---|---|---|
| 8,385,293 B2* | 2/2013 | Rajasimman et al. | 370/332 |
| 8,442,143 B2 | 5/2013 | Lee et al. | |
| 8,446,872 B2 | 5/2013 | Choi et al. | |
| 8,457,642 B2 | 6/2013 | Comeau et al. | |
| 2002/0024943 A1* | 2/2002 | Karaul et al. | 370/338 |
| 2003/0078043 A1* | 4/2003 | Horwath et al. | 455/436 |
| 2003/0186710 A1 | 10/2003 | Muhonen et al. | |
| 2004/0067735 A1 | 4/2004 | Lobley | |
| 2006/0014554 A1 | 1/2006 | Gerlach | |
| 2006/0072501 A1 | 4/2006 | Toshimitsu et al. | |
| 2006/0092883 A1 | 5/2006 | Lee et al. | |
| 2007/0280166 A1 | 12/2007 | Jung et al. | |
| 2007/0280264 A1 | 12/2007 | Milton et al. | |
| 2009/0003266 A1 | 1/2009 | Stolyar et al. | |
| 2009/0047960 A1* | 2/2009 | Gunnarsson et al. | 455/436 |
| 2009/0082020 A1* | 3/2009 | Ch'ng et al. | 455/435.3 |
| 2009/0131055 A1* | 5/2009 | Wang et al. | 455/436 |
| 2009/0161688 A1 | 6/2009 | Park et al. | |
| 2009/0181708 A1 | 7/2009 | Kim et al. | |
| 2009/0247159 A1* | 10/2009 | Flore et al. | 455/434 |
| 2009/0264130 A1* | 10/2009 | Catovic et al. | 455/436 |
| 2009/0312027 A1* | 12/2009 | Foschini et al. | 455/446 |
| 2010/0027456 A1 | 2/2010 | Onggosanusi et al. | |
| 2010/0035555 A1* | 2/2010 | Bala et al. | 455/63.1 |
| 2010/0041411 A1 | 2/2010 | Mallik et al. | |
| 2010/0042716 A1 | 2/2010 | Farajidana et al. | |
| 2011/0028171 A1* | 2/2011 | Guo et al. | 455/502 |
| 2011/0085460 A1 | 4/2011 | Zhang et al. | |
| 2011/0159886 A1 | 6/2011 | Kangas et al. | |
| 2011/0200029 A1* | 8/2011 | Farmandar et al. | 370/338 |
| 2012/0011395 A1 | 1/2012 | Chou et al. | |
| 2012/0096234 A1 | 4/2012 | Jiang et al. | |
| 2012/0113950 A1* | 5/2012 | Skov et al. | 370/329 |
| 2012/0135766 A1 | 5/2012 | Garavaglia et al. | |
| 2012/0264466 A1* | 10/2012 | Vainola | 455/500 |
| 2012/0289275 A1 | 11/2012 | Li et al. | |

FOREIGN PATENT DOCUMENTS

| | | | |
|---|---|---|---|
| CN | 101001414 A | 7/2007 | |
| EP | 0771127 A2 | 5/1997 | |
| EP | 1113689 A2 | 7/2001 | |
| EP | 1713206 A1 | 10/2006 | |
| EP | 1742382 A2 | 1/2007 | |
| EP | 1903816 A1 * | 3/2008 | H04W 8/00 |
| JP | 7298340 A | 11/1995 | |
| JP | 9102977 A | 4/1997 | |
| JP | 2001275145 A | 10/2001 | |
| JP | 2006033826 A | 2/2006 | |
| JP | 2006101497 | 4/2006 | |
| KR | 20060050076 A | 5/2006 | |
| TW | 200820653 A | 5/2008 | |
| WO | WO9853633 A1 | 11/1998 | |
| WO | WO0064213 A1 | 10/2000 | |
| WO | WO02080458 A1 | 10/2002 | |
| WO | WO03069936 A1 | 8/2003 | |
| WO | 2006028547 A1 | 3/2006 | |
| WO | 2007087217 A1 | 8/2007 | |
| WO | 2007124112 A2 | 11/2007 | |
| WO | WO2008011149 A2 | 1/2008 | |
| WO | 2008019706 A1 | 2/2008 | |
| WO | WO2009124083 A1 | 10/2009 | |
| WO | WO2009130582 A1 | 10/2009 | |

OTHER PUBLICATIONS

3GPP TS 36.331 V8.4.0; 3rd Generation Partnership Project; Technical Specification Group Radio Access Network; Evolved Universal Terrestrial Radio Access (E-UTRA) Radio Resource Control (RRC); Protocol specification (Release 8) (Dec. 2008).

Hitachi Ltd: "Consideration on Feedback for Adaptive Cell Clustering", 3GPP Draft; R1-100172 Consideration on Feedback for Adaptive Cell Clustering, 3rd Generation Partnership Project (3GPP), Mobile Competence Centre ; 650, Route Des Lucioles ; F-06921 Sophia-Antipolis Cedex ; France, vol. RAN WGI, no. Valencia, Spain; Jan. 18, 2010, Jan. 22, 2010, XP050418414, [retrieved on Jan. 22, 2010] the whole document.

International Search Report and Written Opinion—PCT/US2011/038201—ISA/EPO—Aug. 9, 2011.

LG Electronics: "Cell Clustering and Feedback for CoMP", 3GPP Draft; RI-091189, 3rd Generation Partnership Project (3GPP), Mobile Competence Centre ; 650, Route Des Lucioles ; F-06921 Sophia-Antipolis Cedex ; France, no. Seoul, Korea; 20090317, Mar. 17, 2009, XP050338806[retrieved on Mar. 17, 2009].

LTE; Evolved Universal Terrestrial Radio Access (E-UTRA) and Evolved Universal Terrestrial Radio Access Network (E-UTRAN); Overall description; Stage 2 (3GPP TS 36.300 version 9.2.0 Release 9), Technical Specification, European Telecommunications Standards Institute (ETSI); 650, Route Des Lucioles ; F-06921 Sophia-Antipolis ; France, vol. 3GPP RAN 2, No. V9.2.0, Feb. 1, 2010, XP014046900, p. 56-58.

Nortel: "Updates on Cell Clustering for CoMP Transmission/Reception", 3GPP Draft; R1-091919(Nortel-Clustering for Comp), 3rd Generation Partnership Project (3GPP), Mobile Competence Centre; 650, Route Des Lucioles; F-06921 Sophia-Antipolis Cedex; France, no. San Francisco, USA; Apr. 28, 2009, XP050339406, [retrieved on Apr. 28, 2009].

Ulrich Barth, "Self-X RAN Autonomous Self Organizing Radio Access Networks", 2009 7th International Symposium on Modeling and Optimization in Mobile, Ad hoc, and Wireless Networks : (WI0PT 2009) ; Seoul, Korea, Jun. 23-27, 2009, IEEE, Piscataway, NJ, USA, [Online] Jun. 23, 2009, pp. 1-36, XP002603562, ISBN: 978-1-4244-4919-4 Retrieved from the Internet: URL:http://www.wiopt.org/pdf/Wi 0pt09__Keyno te__Speech3.pdf>[retrieved on Oct. 5, 2010]pp. 8, 10-11,14-17.

3GPP TR 25.996 v.7.0.0, "Spatial channel model for multiple input multiple output (MIMO) simulations (Release 7)", Jun. 2007, pp. 1-40.

3GPP TS 36.214 v9.2.0, "Evolved Universal Terrestrial Radio Access (EUTRA) Physical Layer-Measurements; Stage 2 (Release 9)", Jun. 2010, pp. 1-14.

3GPP TS 36.300 V8.7.0: Evolved Universal Terrestrial Radio Access (E-UTRA) and Evolved Universal Terrestrial Radio Access Network (E-UTRAN); Overall description; Stage 2, Release 8, Dec. 2008, pp. 1-144.

3GPP TS 36.300 V9.0.0 (Jun. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

3GPP TS 36.300 v9.4.0, "Evolved Universal Terrestrial Radio Access (EUTRA) Overall description; Stage 2 (Release 9)", Jun. 2010, pp. 1-171.

3GPP TS 36.331 V8.4.0: 3rd Generation Partnership Project; Technical Specification Group Radio Access Network; Evolved Universal Terrestrial Radio Access (E-UTRA) Radio Resource Control (RRC); Protocol specification (Release 8) (Dec. 2008).

3GPP TSG RAN WG1 #55bis R1-090237: Setup of CoMP cooperation areas, Nokia Siemens Networks, Nokia, Ljubljana, Slovenia, Jan. 12-16, 2009, pp. 1-4.

3GPP TSG RAN WG1 #55bis, R1-090314: Invstigation on Coordinated Multipoint Transmission Schemes in LTE-Advanced Downlink, NTT DOCOMO, Ljubljana, Slovenia, Jan. 12-16, 2009, slides 1-13.

3GPP TSG RAN WG1 #55bis; R1-090335: CoMP Scheme and System Level Performance Evaluation for LTE-A, CMCC , Ljubljana, Slovenia, Jan. 12-16, 2009, pp. 1-10.

3GPP TSG RAN WG1 #56, R1-090657: Dynamic Cell Clustering for CoMP, LG Electronics, Athens, Greece, Feb. 9-13, 2009, pp. 1-3.

3GPP TSG RAN WG1 #56, R1-090725: Setup of CoMP cooperation areas, Nokia Siemens Networks, Nokia, Athens, Greece, Feb. 9-13, 2009, pp. 1-4.

3GPP TSG RAN WG1 #56, R1-090745: Cell Clustering in CoMP Transmission/Reception, Nortel, Athens, Greece, Feb. 9-13, 2009, pp. 1-4.

(56) References Cited

OTHER PUBLICATIONS

3GPP TSG RAN WG1 #56, R1-090793, Coordinated Multi-Point Transmission—Coordinated Beamforming and Results, Motorola, Athens, Greece, Feb. 9-13, 2009, pp. 1-4.
3GPP TSG RAN WG1 #56, R1-090922: Downlink CoMP-MU-MIMO transmission Schemes, CMCC, Athens, Greece, Feb. 9-13, 2009, pp. 1-8.
3GPP TSG RAN WG1 #56, R1-090956: A Hybrid Concept of ICIC and CoMP for LTE-A: Initial Evaluation. CHTTL, ITRI, Athens, Greece, Feb. 9-13, 2009 pp. 1-5.
3GPP TSG RAN WG1 Meeting #56, R1-090823: Discussion on Timing Advance issue in CoMP & Text Proposal, Huawei, RITT, Texas instruments, CMCC, Athens, Greece, Feb. 9-13, 2009, pp. 1-9.
3GPP TSG RAN WG1 meeting #57, R1-091687: Discussion on the relation between CoMP cooperating set and CoMP reporting set, NEC Group, May 4-8, 2009, pp. 1-3.
3GPP TSG RAN WG1 meeting #57, R1-091903: Adaptive Cell Clustering for CoMP in LTE-A, Hitachi, May 4-8, 2009, pp. 1-6.
3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814 V9.0.0 (Mar. 2010).
A Papadogiannis and G.C. Alexandropoulos, "The Value of Dynamic Clustering of Base Stations for Future Wireless Networks", IEEE International Conference on Fuzzy Systems (FUZZ-IEEE 2010), Barcelona, Spain, Jul. 2010 pp. 1-6.
Catt, "Aspects of Joint Processing in Downlink CoMP", 3GPP Draft, R1-090193, 3rd Generation Partnership Project (3GPP), Mobile Competence Centre, 650, Route Des Lucioles, F-06921 Sophia-Antipolis Cedex, France, no. Ljubljana, Jan. 8, 2009, XP050318126.
Catt; "Aspects of Joint Processing for Downlink CoMP", 3GPP Draft; R1-090942, 3rd Generation Partnership Project (3GPP), Mobile Competence Centre, 650, Route Des Lucioles; F-06921 Sophia-Antipolis Cedex, France, no. Athens, Greece; Feb. 4, 2009, XP050318782.
M. Karakayali, G. Foschini and R. Valenzuela, "Network Coordination for spectrally efficient Communications in Cellular Systems", Aug. 2006, IEEE Wirelesss Communications Magazine pp. 56-61.
Motorola, "Coordinated Multi-Point Transmission—Coordinated Beamforming/Precoding and Some Performance Results", 3GPP Draft, R1-090325 Comp Results (Motorola), 3rd Generation Partnership Project (3GPP), Mobile Competence Centre, 650, Route Des Lucioles, F-06921 Sophia-Antipolis Cedex, France, no. Ljubljana, 20090108, Jan. 8, 2009, XP050318236.
Papadogiannis, A. et al: "A Dynamic Clustering Approach in Wireless Networks with Multi-Cell Cooperative Processing." IEEE Communications, 2008. Piscataway, NJ, USA, May 19, 2008, pp. 4033-4037.
R. Weber, A. Garavaglia, M. Schulist, S. Brueck, A. Dekorsy, "Self-Organizing Adaptive Clustering for Cooperative Multipoint Transmission", Qualcomm CDMA Technologies, submitted to the IEEE Vehicular Technology Conference 2011.
ETRI, "Coordinated multi-cell transmission for L TE-Advanced Downlink", R1-082896, Aug. 18, 2008, entire document, intervening reference.
Motorola "LTE Advanced Technical Proposals", REV-080011, Apr. 2008, entire document.
NTT DoCoMo, "Proposals for L TE-Advanced Technologies", 3GPP TSG RAN WG1 Meeting 53bis, R1-082575, Jun. 30-Jul. 4, 2008, entire document.
Sivarama Venkatesan Ed—Anonymous: "Coordinating Base Stations for Greater Uplink Spectral Efficiency in a Cellular Network", IEEE International Symposium on Personal, Indoor and Mobile Radio Communications. PIMRC, IEEE; PI, XX, Sep. 1, 2007, pp. 1-5, XP031168849 ISBN: 978-1-4244-1143-6 p. 1, left-hand column, line 20—right-hand column, line 37 p. 2, right-hand column, line 42—p. 5, left-hand column, line 6.
Texas instruments "Network MIMO Preceding", 3GPP TSG RAN WG1 #53bis, R1-082497, Jun. 30-Jul. 4, 2008, entire document.
T-Mobile Intl., "Candidate Technologies for LTE-Advanced", REV-080047, Apr. 7-8, 2008, entire document.
Taiwan Search Report—TW100118492—TIPO—Nov. 18, 2013.
Draft Agenda, 3GPP TSG RAN WG1 Meeting #54, R1-082770, Jeju, South Korea, Aug. 18-22, 2008, pp. 1-2.
LG Electronics, "Network MIMO in LTE-Advanced", 3GPP TSG RAN WG1 Meeting #54, R1-082942, Aug. 18-22, 2008, pp. 1-5.
Listing of www.3gpp.org - /ftp.tsg_ran/wg1_rl1/TSGR1_54/Docs retrieved from web on May 20, 2014, pp. 1-12.
Liu, et al., "Multi-cell MIMO Schemes for IEEE 802.16m", IEEE 802.16 Broadband Wireless Access Working Group, IEEE, C802.16m-08/632, Jul. 7, 2008, pp. 1-8.
Molisch, et al., "Base Station Cooperation", IEEE 802.16 Broadband Wireless Access Working Group, IEEE C80216m-08 817, Jul. 7, 2008, pp. 1-6.
Nortel, "Discussion and Link Level Simulation Results on LTE-A Downlink Multi-site MIMO Cooperation", 3GPP TSG-RAN Working Group 1 Meeting #55, R1-084465, Prague, Czech Republic, Nov. 10-14, 2008, pp. 1-11.
Samsung: "Inter-Cell Interference Mitigation Through Limited Coordination", 3GPP Draft; R1-082886 Inter-Cell Interference Mitigation Through Limited Coordination, 3rd Generation Partnership Project (3GPP), Mobile Competence Centre 650, Route Des Lucioles; F-06921 Sophia-Antipolis Cedex; France, no. Jeju; Aug. 12, 2008, XP050316366, [retrieved on Aug. 12, 2008].
Samsung, "Inter-Cell Interference Mitigation Through limited coordination", 3GPP TSG RAN WG1 Meeting #54, R1-082886, Jeju, South Korea Aug. 18-22, 2008, pp. 1-9.
Alcatel-Lucent, "Uplink Coordinated Multi-Point Reception with Distributed Inter-Cell Interference Suppression for LTE-A", 3GPP TSG RAN WG1 Meeting #58, R1-093366, Shenzhen, China, Aug. 24-28, 2009, 4 pages.

* cited by examiner

APPARATUS FOR CLUSTERING CELLS USING NEIGHBOR RELATIONS

CROSS-REFERENCE TO RELATED APPLICATIONS

This application is related to and claims priority from U.S. Provisional application Ser. No. 61/348,502, filed May 26, 2010, entitled "ADAPTIVE CELL CLUSTERING IN A MULTI CLUSTER ENVIRONMENT," which is incorporated herein by reference.

TECHNICAL FIELD

The present disclosure relates generally to electronic communications. More specifically, the present disclosure relates to an apparatus for clustering cells using neighbor relations.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smartphones, computers, etc.) communicate with other electronic devices. For example, a wireless communication device (e.g., cellular phone, smartphone, etc.) may wirelessly communicate with a base station and vice-versa. This may enable the wireless communication device to access and/or communicate voice, video, data and so on.

In some cases, a wireless communication device may be within communication range with multiple base stations. Nevertheless, the base stations may need to coordinate their communications with the wireless communication device to take advantage of this situation. However, communications conditions may change over time, making advantageous coordination more difficult to achieve. As can be seen from this discussion, systems and methods that improve coordination between base stations may be beneficial.

DETAILED DESCRIPTION

The systems and methods disclosed herein describe a base station configured for clustering cells. The base station receives information from one or more wireless communication devices, which it uses to generate a neighbor relation table. In some configurations, the information may include cell/sector information and/or other information (e.g., a wireless communication device identifier, channel condition information, etc.). For example, the base station may use the other information to generate extended information in the neighbor relation table. The base station provides information based on the neighbor relation table to a central unit. The central unit generates cluster information based on the information received from the base station. The central unit sends this cluster information to the base station, which uses the cluster information to coordinate communications between itself, another base station and a wireless communication device, thereby clustering two or more cells. Clustering cells in this way may improve communication performance in the system.

In the following description, for reasons of conciseness and clarity, terminology associated with the LTE standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment (UE), a mobile station, a mobile terminal, a subscriber unit, an access terminal, etc., to name just a few. Likewise, a base station can sometimes be called an access point, a Node B, an evolved Node B (eNB), and so forth. It should be noted that different terminologies apply to different technologies when applicable.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
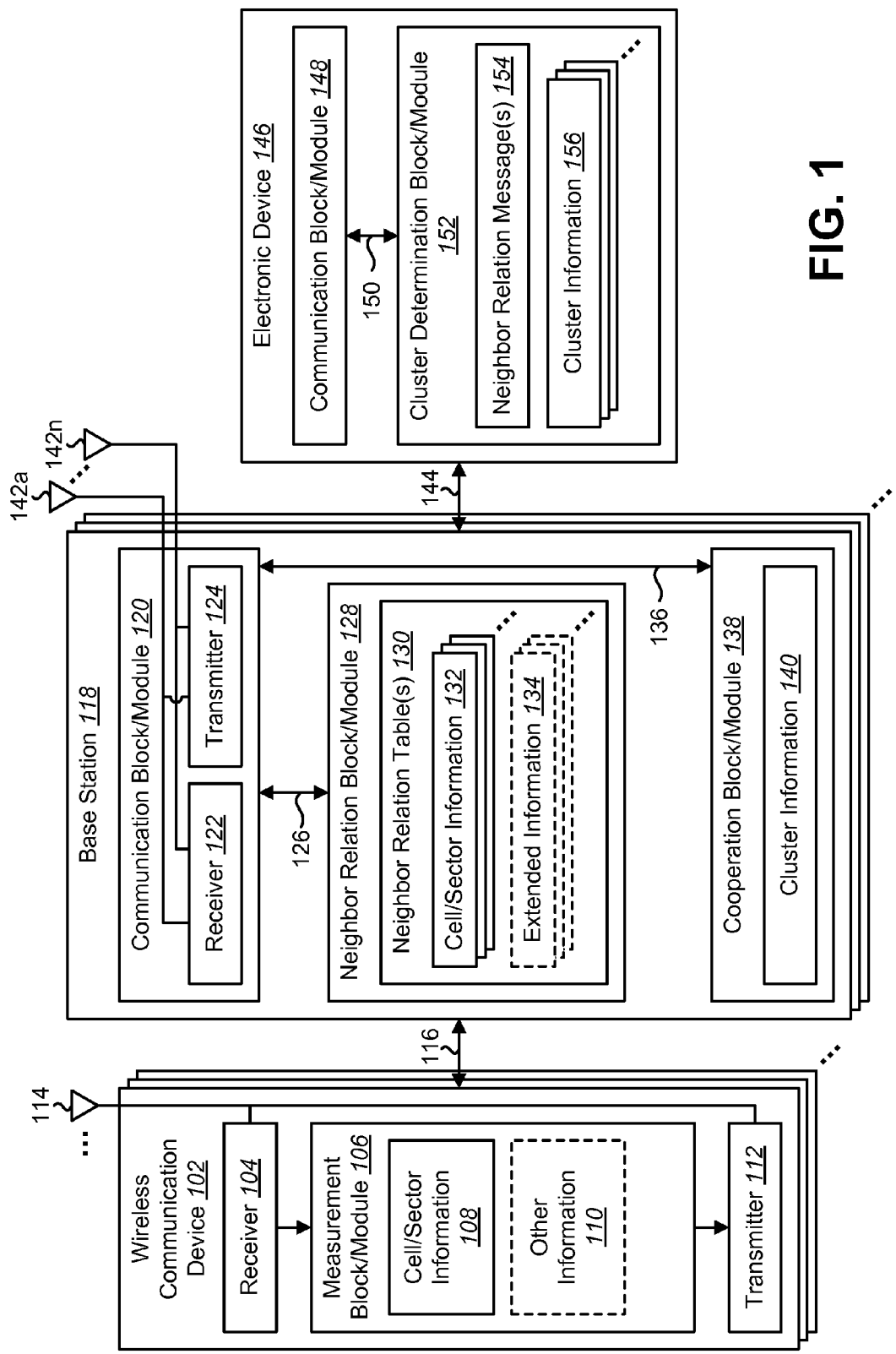
FIG. 1 is a block diagram illustrating one configuration of a base station and an electronic device in which systems and methods for clustering cells using neighbor relations may be implemented.

FIG. 1 is a block diagram illustrating one configuration of a base station 118 and an electronic device 146 in which systems and methods for clustering cells using neighbor relations may be implemented. It should be noted that the term "cell" may be used herein to refer to a cell and/or a sector. In particular, FIG. 1 illustrates one or more wireless communication devices 102, one or more base stations 118 and an electronic device 146. The one or more wireless communication devices 102 may communicate information 116 with the one or more base stations 118. For example, the one or more wireless communication devices 102 each include a receiver 104, a transmitter 112 and one or more antennas 114 for receiving information 116 from and/or for transmitting information 116 to the one or more base stations 118. It should be noted that the term "apparatus" may be used herein to refer to a base station, an electronic device (e.g., a "central unit"), a wireless communication device and/or other device. It should also be noted that a "communication system" may include one or more of a base station, an electronic device (e.g., a "central unit"), a wireless communication device and other device(s).

Each wireless communication device 102 may include a measurement block/module 106. As used herein, the phrase "block/module" indicates that a particular component may be implemented in hardware, software or a combination of both. For example, the measurement block/module 106 may be implemented with hardware components such as circuitry and/or software components such as instructions or code, etc.

The measurement block/module 106 may be used to measure (e.g., receive, capture, detect, etc.) cell/sector information 108. For example, each base station 118 may communicate with one or more wireless communication devices 102 located in one or more cells or sectors. More specifically, a wireless communication device 102 may receive signals that may be used to obtain cell/sector information 108 for one or more cells or sectors using a receiver 104. Cells and sectors are described in greater detail below. The cell/sector information 108 may include information about each cell and/or sector that the wireless communication device 102 may detect. In one configuration, the cell/sector information 108 includes one or more identifiers for each of the cells/sectors detected by a wireless communication device 102. Examples of identifiers include numbers, bit sequences, alphanumeric sequences and/or some other indication that identifies a particular cell or sector. For instance, cell/sector information 108 may include target cell identifiers (TCIs) for each cell or sector detected by a wireless communication device 102.

In some configurations, the measurement block/module 106 may measure and/or have (e.g., receive, capture, detect, etc.) other information 110. The other information 110 may include information about communication conditions with one or more base stations 118 and/or other information. For example, other information 110 may include signal strength measurements, channel quality measurements, channel loading, amounts of incorrectly received data (e.g., number of dropped packets, number of retransmission requests, etc.), data rates, modulation types, a wireless communication device 102 identifier, etc. For instance, other information 110 may include a reference signal received power (RSRP) measurement, channel quality indicator (CQI) measurement, user equipment identifier (UE ID), etc. Other information 110 may be obtained (using a receiver 104, for example) for one or more of the cells or sectors that a wireless communication device 102 is able to detect.

The one or more base stations 118 may communicate information 116 with the one or more wireless communication devices 102 using a receiver 122, a transmitter 124 and/or one or more antennas 142a-n. For instance, the one or more base stations 118 transmit electromagnetic signals to and receive electromagnetic signals from the one or more wireless communication devices 102. It should be noted that each of the base stations 118 may communicate with one or more wireless communication devices 102 that are within a cell or sector coverage area. For example, a cell or sector is a geographical area serviced by a base station 118. A single base station 118 may provide one or more cells or sectors for communication. For example, a base station 118 may provide three sectors for communication with wireless communication devices 102. As used herein, the term "cell" may be used to refer to a cell and/or a sector.

Each base station 118 may include a communication block/module 120, a neighbor relation block/module 128 and/or a cooperation block/module 138. Each base station 118 may use a communication block/module 120 to communicate with other devices, such as one or more wireless communication devices 102, other base stations 118 and/or the electronic device 146. The communication block/module 120 may include a receiver 122 and/or a transmitter 124.

The receiver 122 and/or transmitter 124 may be used to receive and/or transmit electromagnetic signals (using one or more antennas 142a-n, for example). For instance, a base station 118 may wirelessly communicate with one or more wireless communication devices 102, other base stations 118 and/or the electronic device 146 using wireless (e.g., "over-the-air" (OTA)) signaling.

In some configurations, the communication block/module 120 may be used to communicate with other devices using a wired connection. For example, the communication block/module 120 may include blocks/modules used to communicate with other base stations 118 and/or the electronic device 146. In one configuration, the communication block/module 120 is used to communicate with other base stations 118 using an "X2" interface and/or with the electronic device 146 using an "S1" interface.

The communication block/module 120 may provide information to and/or obtain information from other block/modules. For example, the communication block/module 120 may provide information 126 such as received cell/sector information 108 and/or other information 110 to the neighbor relation block/module 128. Additionally or alternatively, the communication block/module 120 may receive or obtain information 126 based on the neighbor relation table(s) 130 (e.g., an entire neighbor relation table 130, portions of a neighbor relation table 130, etc.) from the neighbor relation block/module 128 for transmission to the electronic device 146. Neighbor information based on the neighbor relation table 130 (that may be transmitted) may be referred to as a "neighbor relation message" or a "neighbor relation table (NRT) message." The communication block/module 120 may also provide information 136 (e.g., cluster information 140) to the cooperation block/module 138. Additionally or alternatively, the communication block/module 120 may receive or obtain information 136 from the cooperation block/module 138 for transmission to one or more other devices (e.g., other base stations 118).

The neighbor relation block/module 128 may be used to manage information concerning neighboring cells or sectors. For example, the neighbor relation block/module 128 may manage information regarding cells or sectors that are detectable by the one or more wireless communication devices 102. In one configuration, one or more of the wireless communication devices 102 may send cell/sector information 108 (as part of information 116, for example) to a base station 118. The base station 118 may receive the cell/sector information 108 and store it 108 as cell/sector information 132 in one or more neighbor relation tables 130. For instance, information regarding cells or sectors in the neighbor relation table(s) 130 may be referred to as "neighbor relations."

The one or more neighbor relation tables 130 may be included in and/or managed by the neighbor relation block/module 128. It should be noted that the cell/sector information 132 included in the neighbor relation table 130 may or may not be in the same format as the cell/sector information 108 sent by a wireless communication device 102. More specifically, the base station 118 may add other information to and/or change the format of the received cell/sector information 108 to produce cell/sector information 132 in the neighbor relation table 130. In one configuration, the neighbor relation table 130 may be a neighbor relation table (NRT) as provided by current 3GPP specifications. For example, the cell/sector information 132 may include cell/sector identifiers (e.g., target cell identifiers (TCIs)) for cells/sectors detected by one or more wireless communication devices 102.

In some configurations, the neighbor relation table 130 may also include extended information 134. The extended information 134 may be based on other information 110 received from one or more wireless communication devices 102. For example, the extended information 134 may include information regarding communication conditions and/or other information. In one configuration, the extended information 134 may include rankings, channel quality indicators (CQIs), reference signal received power (RSRP) measurements and/or corresponding wireless communication device 102 identifiers. One example of a wireless communication device 102 identifier is a user equipment identifier (UE ID) (e.g., cell-radio network temporary identifier (C-RNTI)). The neighbor relation table 130 may further include information and/or be structured based on the cell/sector information 132 in conjunction with extended information 134 in some configurations. For example, a base station 118 (e.g., neighbor relation block/module 128) may rank the cell/sector information 132 (and/or extended information 134) based on the extended information 134. For instance, cells/sectors (as indicated by the cell/sector information 132) may be ranked based on corresponding channel conditions/measurements included in the extended information 134. Neighbor relation indices may additionally be included in the one or more neighbor relation tables 130 in some configurations. For example, neighbor relation entries may be numbered using a neighbor relation index number.

The one or more base stations 118 may communicate information 144 with the electronic device 146. Examples of the electronic device 146 include one or more computers, servers, gateways, embedded systems, etc. The electronic device 146 may include a communication block/module 148 and/or a cluster determination block/module 152. The communication block/module 148 may be used to communicate based on wired and/or wireless communication. For example, the electronic device 146 may communicate information 144 with the one or more base stations 118 using wired and/or wireless links. For instance, the communication block/module 148 may communicate with (e.g., transmit information 144 to and/or receive information 144 from) one or more base stations 118 using an "S1" interface, another interface (e.g., a "central unit interface") and/or using over-the-air (OTA) signaling. In the case that wireless communications are used, the electronic device 146 may include one or more antennas (not shown).

The communication block/module 148 may provide (received) information 150 to and/or obtain information 150 (for transmission) from the cluster determination block/module 152. For example, the communication block/module 148 may provide one or more neighbor relation messages 154 to the cluster determination block/module 152 that have been received from one or more base stations 118 (as part of information 150). In some configurations, multiple neighbor relation messages 154 that are mapped to one message may be received from a base station 118. This message may be decoded and/or de-mapped by the electronic device 146. Additionally or alternatively, the communication block/module 148 may obtain or receive cluster information 156 (as part of information 150) from the cluster determination block/module 152 for transmission to the one or more base stations 118. In some configurations, cluster information 156 may be formatted into one or more cluster messages. These cluster messages may be transmitted individually or encoded and/or mapped to one message for transmission by the electronic device 146.

The cluster determination block/module 152 may be used to determine cluster information 156. For example, the cluster determination block/module 152 may determine cluster information 156 based on one or more neighbor relation messages 154. The cluster information 156 may be used to indicate which cells/sectors are or should be clustered. The electronic device 146 may transmit the cluster information 156 to one or more base stations 118.

One or more base stations 118 may receive the cluster information 140 from the electronic device 146. The cluster information 140 may be received as one or more cluster messages. In some configurations, multiple cluster messages may be decoded and/or de-mapped from one message. The cluster information 140 may be provided to the cooperation block/module 138 (as part of information 136, for example). The cooperation block/module 138 may use the cluster information 140 to cooperate with other base stations 118. In other words, cells/sectors of the one or more base stations 118 may be clustered based on the cluster information 140.

Base stations 118 that provide clustered sectors/cells may operate cooperatively. For example, base stations 118 with clustered cells/sectors may operate cooperatively to communicate with a wireless communication device 102 (assuming the wireless communication device 102 can communicate with the two or more base stations 118 with clustered cells/sectors). For instance, the cooperation block/module 138 may use the cluster information 140 to coordinate communications (between the base stations 118 and a wireless communication device 102, for example) with the other base stations 118. More specifically, the cooperation block/module 138 may generate information or instructions (e.g., "coordination information") used to coordinate communications with other base stations 118. The cooperation block/module 138 may provide this coordination information (as part of information 136) to the communications block/module 120 for transmission to one or more other base stations 118. For example, this coordination information may be signaled to one or more other base stations 118 using an X2 interface and/or over-the-air (OTA) signaling. The base station 118 may additionally or alternatively receive coordination information from one or more other base stations 118. This received coordination information may be used to coordinate communications with a wireless communication device 102 with one or more other base stations 118. For instance, this received coordination information may be provided to the cooperation block/module 138 for this purpose (as part of information 136, for example).

Figure 2:
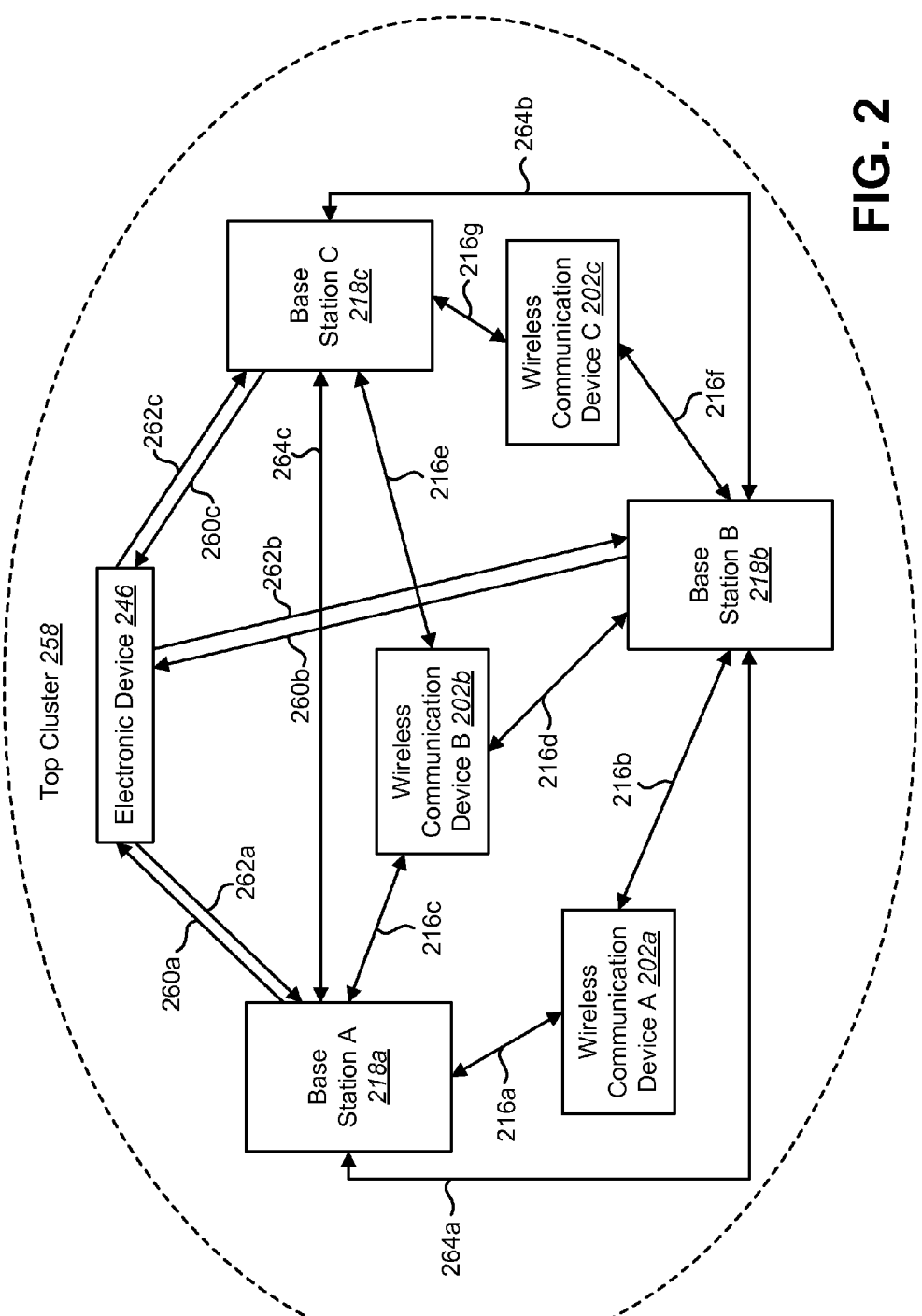
FIG. 2 is a block diagram illustrating one example of an electronic device and base stations in which systems and methods for clustering cells using neighbor relations may be implemented.

FIG. 2 is a block diagram illustrating one example of an electronic device 246 and base stations 218a-c in which systems and methods for clustering cells using neighbor relations may be implemented. In this example, a top cluster 258 is illustrated. A top cluster 258 may be a network or group of base stations 218a-c within which cell/sector clustering may be used. In some configurations, the top cluster 258 may be static and/or manually configured.

An electronic device 246, three base stations 218a-c and three wireless communication devices 202a-c are illustrated in this example. Each of the base stations 218a-c communicates with the electronic device 246. More specifically, base station A 218a sends information 260a, base station B 218b sends information 260b and base station C 218c sends information 260c to the electronic device 246. Furthermore, the electronic device 246 sends information 262a to base station A 218a, sends information 262b to base station B 218b and sends information 262c to base station C 218c. The information communicated between the electronic device 246 and the base stations 218a-c may be communicated using a wired and/or wireless link (using an S1 interface, a "central unit interface" and/or an over-the-air (OTA) link, for example).

As illustrated, base station A 218a communicates with wireless communication devices A-B 202a-b, base station B 218b communicates with wireless communication devices A-C 202a-c and base station C 218c communicates with wireless communication devices B-C 202b-c. More specifically, base station A 218a communicates information 216a with wireless communication device A 202a and information 216c with wireless communication device B 202b. Base station C 218c communicates information 216e with wireless communication device B 202b and communicates information 216g with wireless communication device C 202c. Base station B 218b communicates information 216b with wireless communication device A 202a, information 216d with wireless communication device B 202b and information 216f with wireless communication device C 202c.

The information 216a-g communicated between base stations 218a-c and wireless communication devices 202a-c may include signals and/or data. This information 216a-g may be communicated wirelessly. For example, the wireless communication devices 202a-c and the base stations 218a-c may communicate with each other by sending and/or receiving electromagnetic signals using antennas.

The base stations 218a-c may communicate with each other. More specifically, base station A 218a may communicate information 264a with base station B 218b and information 264c with base station C 218c. Furthermore, base station B 218b may communicate information 264b with base station C 218c. This information 264a-c may be communicated using a wired and/or wireless link (using an X2 interface and/or an over-the-air (OTA) link, for example).

In one example, assume that base station A 218a is providing a serving cell/sector to wireless communication device B 202b. In other words, base station A 218a is providing communication resources to wireless communication device B 202b. Wireless communication device B 202b receives cell/sector information 216e from base station C 218c, cell/sector information 216d from base station B 218b and/or cell/sector information 216c from base station A 218a. It should be noted that the cell/sector information 216c received from base station A 218a may identify one or more cells/sectors provided by base station A 218a. In one configuration, wireless communication device B 202b may receive target cell identifiers (TCIs) for one or more cells/sectors from each of base stations A-C 218a-c.

In some configurations, wireless communication device B 202b may measure, receive and/or obtain other information 216c-e from base stations A-C 218a-c. For example, wireless communication device B 202b may measure and/or receive information 216c-e regarding channel conditions (e.g., channel quality indicators (CQIs), reference signal received power (RSRP), etc.). Additionally or alternatively, wireless communication device B 202b may have other information, such as information (e.g., an identifier) that identifies wireless communication device B 202b (e.g., UE ID).

Wireless communication device B 202b may transmit the cell/sector information 216c to base station A 218a. Additionally or alternatively, wireless communication device B 202b may transmit other information 216c to base station A 218a, such as information 216c indicating channel conditions (e.g., CQI, RSRP) and/or an identifier (e.g., UE ID). Wireless communication device B 202b may optionally drop and/or not transmit information regarding cells/sectors that do not meet certain standards or thresholds. For example, if the signal power received from base station C 218c is not strong enough to meet a minimum threshold, wireless communication device B 202b may discard the information (e.g., cell/sector information and/or other information) 216e corresponding to base station C 218c.

Base station A 218a may receive the cell/sector information 216c and/or other information 216c from wireless communication device B 202b. For example, base station A 218a may store the cell/sector information 216c in a neighbor relation table 130. Thus, the neighbor relation table 130 may include cell/sector information 132 that indicates cells/sectors that wireless communication device B 202b is able to detect. In a similar fashion, the same or another neighbor relation table 130 on base station A 218a may include cell/sector information 132 received from wireless communication device A 202a (about cells/sectors detectable by wireless communication device A 202a from base stations A and/or B 218a-b, for example).

In some configurations, the one or more neighbor relation tables 130 on base station A 218a may include extended information 134 based on other information 216c, 216a received from wireless communication device B 202b and/or wireless communication device A 202a. For example, the extended information 134 may include information about communication conditions such as signal strength (e.g., RSRP), channel quality (e.g., CQI), etc. Furthermore, the extended information 134 may include identifiers (e.g., UE IDs) for wireless communication device B 202b and/or wireless communication device A 202a. The extended information 134 may additionally or alternatively include cell/sector rankings based on the other information 216c, 216a received by base station A 218a.

Base station A 218a may transmit one or more neighbor relation messages 260a to the electronic device 246. The neighbor relation message(s) 260a may be information based on the neighbor relation table 130. For example, a neighbor relation message 260a may include the entire neighbor relation table 130, part of the neighbor relation table 130 or other information based on the neighbor relation table 130. For example, a neighbor relation message 260a may include only a list of cell/sector identifiers (e.g., from cell/sector information 132). In another example, a neighbor relation message 260a may include part of a list of cell/sector identifiers.

In some configurations, the one or more neighbor relation messages 260a may include extended information 134 and/or information based on the extended information 134. For example, a neighbor relation message 260a may include rankings, channel condition information, wireless communication device A-B 202*a-b* identifiers, etc.

The electronic device 246 may receive the one or more neighbor relation messages 260*a*. The electronic device 246 may use the one or more neighbor relation messages 260*a* provided by base station A 218*a* in addition to or alternatively from one or more neighbor relation messages 260*b-c* provided by base stations B-C 218*b-c* in order to determine cluster information 156. The cluster information 156 may indicate or instruct which cells/sectors are to be clustered (and thus, which base stations 218*a-c* should cooperate in communicating with wireless communication devices 202). The electronic device 246 may transmit the cluster information 262 to one or more of base stations A-C 218*a-c*. For example, assume that the electronic device 246 generates and transmits cluster information 262*a* to base station A 218*a*, indicating that a cell/sector provided by base station A 218*a* should be clustered with a cell/sector provided by base station B 218*b*. In this case, base station A 218*a* may communicate information 264*a* with base station B 218*b* in order to coordinate communications with wireless communication device B 202*b*. The information 264*a* communicated between base stations A-B 218*a-b* may include scheduling information, for example. In one configuration, base station A 218*a* may communicate information 264*a* with base station B 218*b* using an X2 interface.

Figure 3:
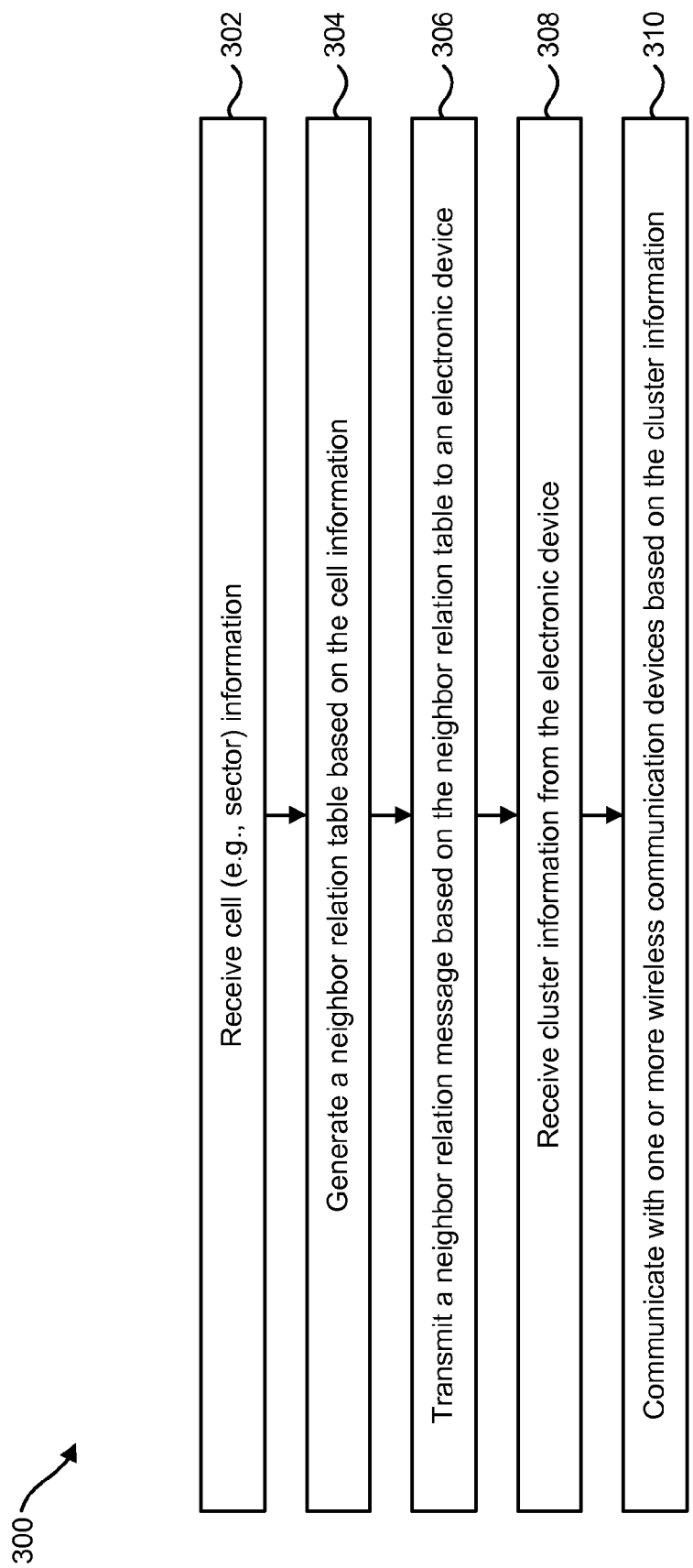
FIG. 3 is a flow diagram illustrating one configuration of a method for clustering cells using neighbor relations.

FIG. 3 is a flow diagram illustrating one configuration of a method 300 for clustering cells using neighbor relations. A base station 118 may receive 302 cell (e.g., cell/sector) information 108 from one or more wireless communication devices 102. For example, the cell information 108 may indicate one or more cells/sectors that a wireless communication device 102 is able to detect. It should be noted that in some configurations, the base station 118 may first send an instruction to one or more wireless communication devices 102 requesting cell information 108 (e.g., TCIs).

The base station 118 may generate 304 a neighbor relation table 130 based on the cell information 132. In one configuration, the neighbor relation table 130 includes information such as cell/sector identifiers (e.g., TCIs) and/or information associated with those cells/sectors. It should be noted that the neighbor relation table 130 may include information that is received from the one or more wireless communication devices 102 and/or information that the base station 118 generates (based on the received information).

The base station 118 may transmit 306 a neighbor relation message based on the neighbor relation table 130 to an electronic device 146. For example, the neighbor relation message may include the entire neighbor relation table 130, part of the neighbor relation table 130 and/or some other information based on the neighbor relation table 130. For instance, the neighbor relation message may include a list of cell/sector identifiers (e.g., TCIs).

The base station 118 may receive 308 cluster information 140 from the electronic device 146. The cluster information 140 may indicate which cells/sectors should be clustered. For example, the cluster information 140 may indicate which base stations 118 should coordinate with each other to communicate with one or more wireless communication devices 102. Accordingly, the base station 118 may communicate with another base station 118 to coordinate communications with one or more wireless communication devices 102. In one configuration, coordinating communications between base stations 118 and a wireless communication device 102 may be referred to as Cooperative Multipoint (CoMP) communications.

The base station 118 may communicate 310 with one or more wireless communication devices 102 based on the cluster information 140. For example, the base station 118 may transmit information to and/or receive information from a wireless communication device 102 based on the cluster information 140. For instance, if a wireless communication device 102 can communicate with two base stations 118, where the base stations 118 provide cells/sectors that are clustered, then the base station 118 may communicate 310 with the wireless communication device 102 as it 118 coordinates with the other base station 118 (with the clustered cell/sector). It should be noted that the base station 118 may communicate 310 with one or more wireless communication devices 102 that did not provide cell/sector information 108 and/or other information 110.

Figure 4:
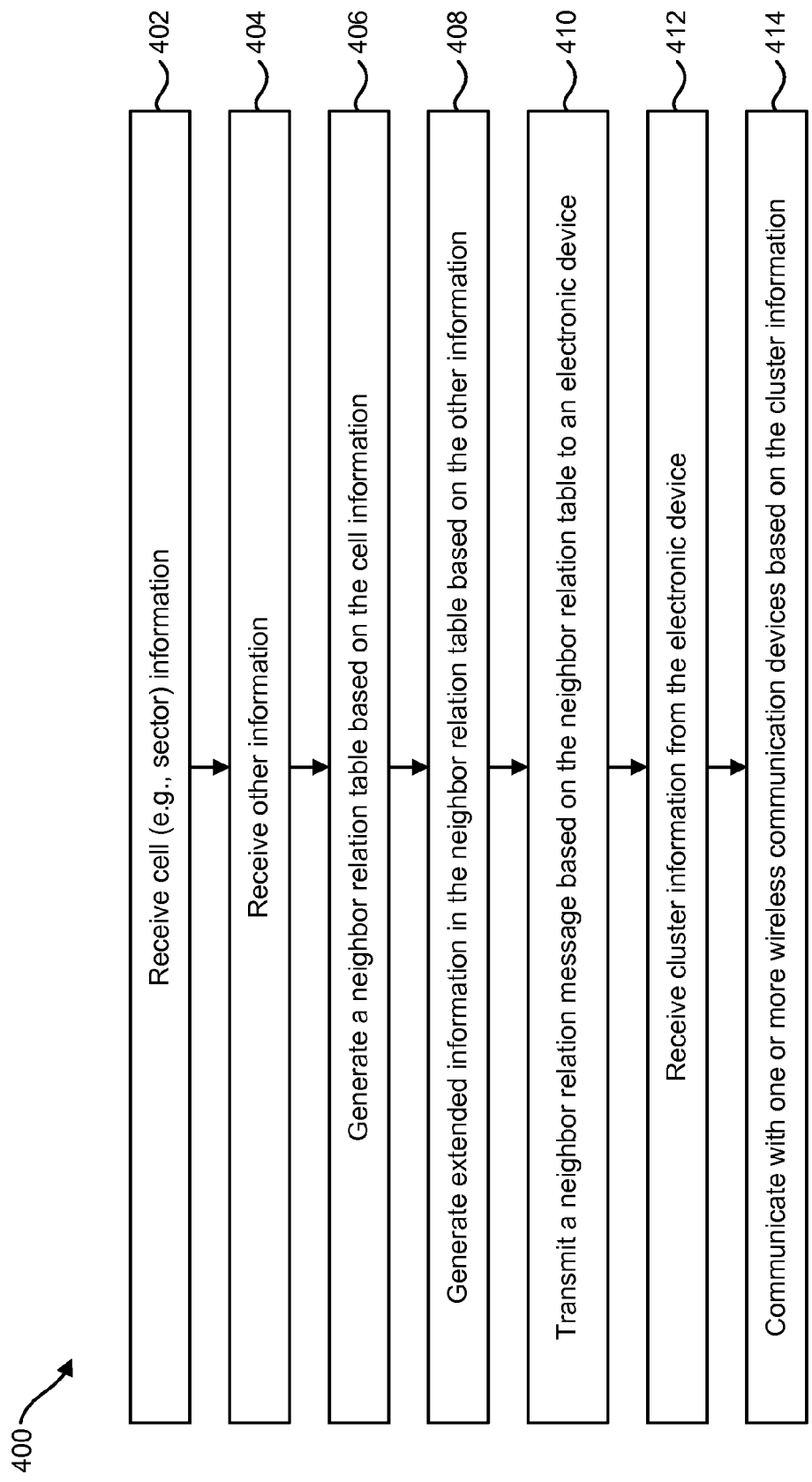
FIG. 4 is a flow diagram illustrating another configuration of a method for clustering cells using neighbor relations.

FIG. 4 is a flow diagram illustrating another configuration of a method 400 for clustering cells using neighbor relations. A base station 118 may receive 402 cell (e.g., cell/sector) information 108 from one or more wireless communication devices 102. For example, the cell information 108 may indicate one or more cells/sectors (e.g., TCIs) that a wireless communication device 102 is able to detect. It should be noted that in some configurations, the base station 118 may first send an instruction to one or more wireless communication devices 102 requesting cell information 108 (e.g., TCIs).

The base station 118 may receive 404 other information 110. For example, the base station 118 may receive 404 other information 110 from one or more wireless communication devices 102. In one configuration, other information 110 may include information regarding communication conditions, a wireless communication device 102 identifier and/or other information. For instance, the other information 110 may include reference signal received power (RSRP), channel quality indicator(s) (CQI), a user equipment identifier (UE ID) and/or other information.

The base station 118 may generate 406 a neighbor relation table 130 based on the cell information 132. In one configuration, the neighbor relation table 130 includes information such as cell/sector identifiers (e.g., TCIs) and information associated with those cells/sectors. It should be noted that the neighbor relation table 130 may include information that is received from the one or more wireless communication devices 102 and/or information that the base station 118 generates (based on the received information, for example).

The base station 118 may generate 408 extended information 134 in the neighbor relation table 130 based on the other information 110. In one configuration, the base station 118 adds received information to the neighbor relation table 130 such as one or more wireless communication device 102 identifiers, information regarding channel conditions, etc. For instance, the base station 118 may add one or more user equipment identifiers (UE IDs), channel quality indicators (CQIs) and/or reference signal received power (RSRP) measurements, etc. The base station 118 may additionally or alternatively generate rankings for the cells/sectors indicated in the neighbor relation table 130. For example, the base station 118 may rank the cells/sectors in the neighbor relation table 130 based on channel condition information. In one configuration, generating rankings may entail sorting the neighbor relation table 130 with the higher ranked cells/sectors in a particular position (e.g., the top of the table). In another configuration, the base station 118 may generate numerical rankings that may be included in the neighbor relation table 130.

The base station 118 may transmit 410 a neighbor relation message based on the neighbor relation table 130 to an electronic device 146. For example, the automatic neighbor relation message may include the entire neighbor relation table 130, part of the neighbor relation table 130 and/or some other information based on the neighbor relation table 130. For instance, the neighbor relation message may include a list of cell/sector identifiers (e.g., TCIs). It should be noted that rankings may be implicitly indicated, for example, by the order in which the list of cells/sectors are placed in the neighbor relation table 130 and/or in the neighbor relation message. In some configurations, each of the neighbor relation messages corresponding to cells from a base station 118 may be encoded and/or mapped to a message for transmission to the central unit 146.

The base station 118 may receive 412 cluster information 140 from the electronic device 146. The cluster information 140 may indicate which cells/sectors should be clustered. For example, the cluster information 140 may indicate which base stations 118 should coordinate with each other to communicate with one or more wireless communication devices 102. Accordingly, the base station 118 may communicate with another base station 118 to coordinate communications with one or more wireless communication devices 102. In one configuration, coordinating communications between base stations 118 and a wireless communication device 102 may be referred to as Cooperative Multipoint (CoMP) communications.

The base station 118 may communicate 414 with one or more wireless communication devices 102 based on the cluster information 140. For example, the base station 118 may transmit information to and/or receive information from a wireless communication device 102 based on the cluster information 140. For instance, if a wireless communication device 102 can communicate with two base stations 118, where the base stations 118 provide cells/sectors that are clustered, then the base station 118 may communicate with the wireless communication device 102 as it 118 coordinates with the other base station 118 (with the clustered cell/sector).

Figure 5:
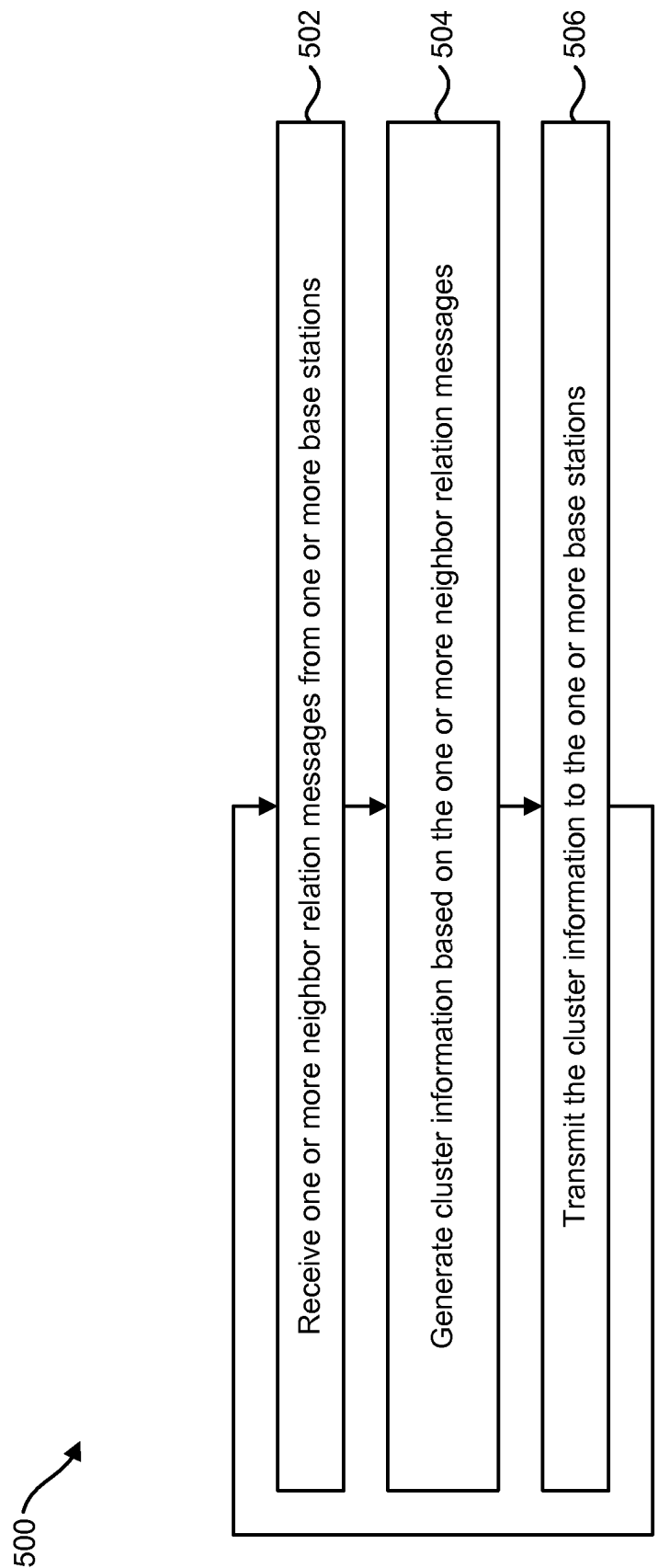
FIG. 5 is a flow diagram illustrating another configuration of a method for clustering cells using neighbor relations.

FIG. 5 is a flow diagram illustrating another configuration of a method 500 for clustering cells using neighbor relations. An electronic device 146 may receive 502 one or more neighbor relation messages from one or more base stations 118. In some configurations, the electronic device 146 receives 502 the one or more neighbor relation messages using an S1 interface, a "central unit" interface and/or over-the-air (OTA) signaling. For instance, the communication block/module 148 may receive 502 the one or more neighbor relation messages, which may be provided to the cluster determination block/module 152.

The electronic device 146 may generate 504 cluster information 156 based on the one or more neighbor relation messages. It should be noted that the neighbor relations messages may be based on cell information 132 and/or extended information 134. For example, the neighbor relation messages may include information such as cell/sector identifiers, wireless communication device 102 identifiers, channel condition information, rankings and/or other information, etc. In one configuration, the electronic device 146 may generate 504 cluster information 156 based only on cell/sector identifiers (e.g., TCIs). In other configurations, the electronic device 146 may use additional or alternative information to generate 504 the cluster information 156. For instance, the electronic device 146 may use cell/sectors identifiers, wireless communication device 102 identifiers (e.g., UE IDs), channel condition information (e.g., RSRP and/or CQI, etc.), rankings and/or other information. The cluster information 156 may indicate which cells/sectors should be clustered (e.g., which base stations 118 should cooperate in communicating with one or more wireless communication devices 102).

The electronic device 146 may transmit 506 the cluster information 156 to the one or more base stations 118. For example, the electronic device 146 may transmit a cluster message including the cluster information 156 to one or more base stations 118. In some configurations, the cluster information 156 that is transmitted may be different for each base station 118. For instance, the electronic device 146 may transmit only cluster information 156 that is useful to a particular base station 118. More specifically, the electronic device 146 may transmit only cluster information 156 to a base station 118 concerning clustering related to those cells/sectors that the base station 118 controls or provides. In other configurations, the electronic device 146 may (globally) transmit the same cluster information 156 to all of the base stations 118.

Figure 6:
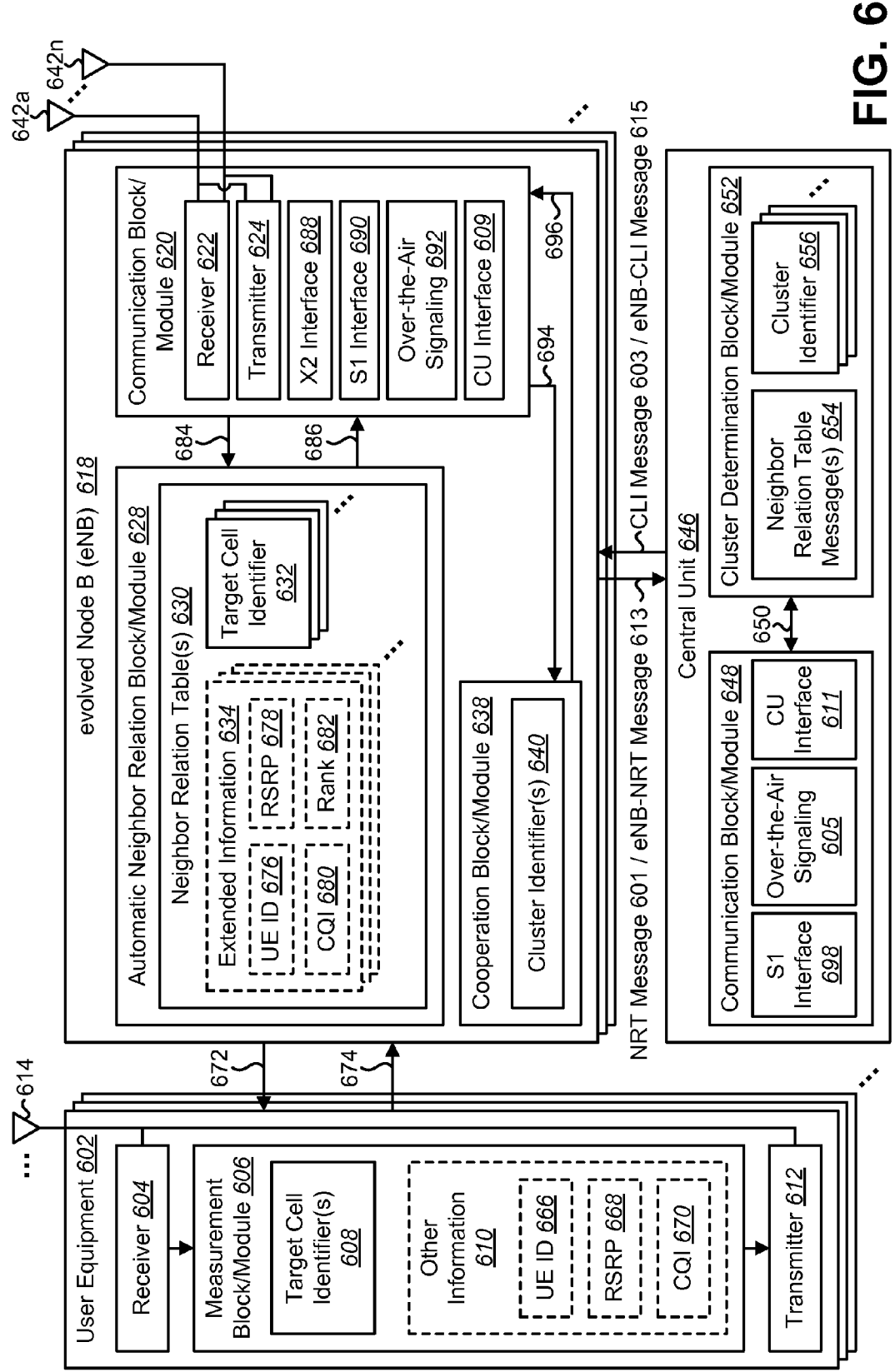
FIG. 6 is a block diagram illustrating one configuration of an evolved Node B (eNB) and a central unit in which systems and methods for clustering cells using neighbor relations may be implemented.

FIG. 6 is a block diagram illustrating one configuration of an evolved Node B (eNB) 618 and a central unit 646 in which systems and methods for clustering cells using neighbor relations may be implemented. In particular, FIG. 6 illustrates one or more user equipments (UEs) (e.g., wireless communication devices, mobile stations, terminals, etc.) 602, one or more eNBs (e.g., base stations, access points, Node Bs, etc.) 618 and a central unit 646. As noted above, while terms such as UE, Node B and eNB may be terms used in 3GPP specifications, the systems and methods disclosed in these terms should not be limited in scope as a result. More specifically, the term "user equipment" or UE may refer to a "wireless communication device." The terms "Node B," "evolved Node B" or "eNB" may refer to a "base station." It should also be noted that examples of base stations include Node Bs, Home Node Bs (HNBs), evolved Node Bs (eNBs), Home evolved Node Bs (HeNBs), access points, base stations, etc. The one or more UEs 602 may communicate with the one or more eNBs 618. For example, the one or more UEs 602 each include a receiver 604, a transmitter 612 and one or more antennas 614 for receiving information 672 from and/or for transmitting information 674 to the one or more eNBs 618.

Each UE 602 may include a measurement block/module 606. As used herein, the phrase "block/module" indicates that a particular component may be implemented in hardware, software or a combination of both. For example, the measurement block/module 606 may be implemented with hardware components such as circuitry and/or software components such as instructions or code, etc.

The measurement block/module 606 may be used to measure (e.g., receive, capture, detect, etc.) one or more target cell identifiers (TCIs) 608. For example, each eNB 618 may communicate with one or more UEs 602 located in one or more cells or sectors. More specifically, a UE 602 may receive signals 672 that may be used to obtain TCIs 608 for one or more cells or sectors using a receiver 604. The TCIs 608 may be identifiers for each cell and/or sector that the UE 602 may detect. In some configurations, an eNB 618 may request that a UE 602 obtain TCIs 608. For example, an eNB 618 may send a message to a UE 602 instructing it 602 to obtain (and report) TCIs 608.

In some configurations, the measurement block/module 606 may measure (e.g., receive, capture, detect, etc.) and/or have other information 610. The other information 610 may include information about communication conditions with one or more eNBs 618 and/or other information 610. For example, other information 610 may include signal strength measurements, channel quality measurements, channel loading, amounts of incorrectly received data (e.g., number of dropped packets, number of retransmission requests, etc.), data rates, modulation types, a UE 602 identifier, etc. For instance, other information 610 may include one or more of a user equipment identifier (UE ID) 666, reference signal received power (RSRP) measurement 668, channel quality indicator (CQI) 670 and other information. Other information 610 may be obtained (using a receiver 604, for example) for one or more of the cells or sectors that a UE 602 is able to detect.

The one or more eNBs 618 may receive information 674 from the one or more UEs 602 using a receiver 622 and one or more antennas 642*a-n*. Furthermore, the one or more eNBs 618 may transmit information 672 to the one or more UEs 602 using a transmitter 624 and one or more antennas 642*a-n*. For instance, the one or more eNBs 618 transmit electromagnetic signals to and receive electromagnetic signals from the one or more UEs 602. It should be noted that each of the eNBs 618 may communicate with one or more UEs 602 that are within a cell or sector coverage area. For example, a cell or sector is a geographical area serviced by an eNB 618. A single eNB 618 may provide one or more cells or sectors for communication. For example, an eNB 618 may provide three sectors for communication with UEs 602. As used herein, the term "cell" may be used to refer to a cell and/or a sector.

Each eNB 618 may include a communication block/module 620, an automatic neighbor relation block/module 628 and/or a cooperation block/module 638. Each eNB 618 may use a communication block/module 620 to communicate with other devices, such as one or more UEs 602, other eNBs 618 and/or the central unit 646. The communication block/module 620 may include a receiver 622, a transmitter 624, an X2 interface 688, an S1 interface 690 an over-the-air (OTA) signaling block/module 692 and/or a central unit interface 609 (illustrated as "CU Interface" for convenience in FIG. 6).

The receiver 622 and/or transmitter 624 may be used to receive and/or transmit electromagnetic signals (using one or more antennas 642*a-n*, for example). For instance, an eNB 618 may wirelessly communicate with one or more UEs 602, other eNBs 618 and/or the central unit 646 using wireless (e.g., "over-the-air" (OTA)) signaling 692.

In some configurations, the communication block/module 620 may be used to communicate with other devices using a wired connection. For example, the communication block/module 620 may include blocks/modules used to communicate with other eNBs 618 and/or the central unit 646. In one configuration, the X2 interface 688 is used to communicate with other eNBs 618 and/or the S1 interface 690 and/or central unit interface 609 is used to communicate with the central unit 646.

The communication block/module 620 may provide information to and/or obtain information from other block/modules. For example, the communication block/module 620 may provide information 684 such as received TCIs 608 and/or other information 610 to the automatic neighbor relation block/module 628. Additionally or alternatively, the communication block/module 620 may receive or obtain information 686 based on the neighbor relation table 630 (e.g., the entire neighbor relation table 630, portions of the neighbor relation table 630, etc.) from the automatic neighbor relation block/module 628 for transmission to the central unit 646. Transmitted information based on the neighbor relation table 630 may be referred to as one or more "neighbor relation table messages" (e.g., NRT messages). The communication block/module 620 may also provide information 694 (e.g., one or more cluster identifiers 640) to the cooperation block/module 638. Additionally or alternatively, the communication block/module 620 may receive or obtain information 696 from the cooperation block/module 638 for transmission to one or more other devices (e.g., other eNBs 618).

The automatic neighbor relation block/module 628 may be used to manage information concerning neighboring cells or sectors. For example, the neighbor relation block/module 628 may manage information regarding cells or sectors that are detectable by the one or more UEs 602. In one configuration, one or more of the UEs 602 may send TCIs 608 (as part of information 674, for example) to an eNB 618. The eNB 618 may receive the TCIs 608 and store them 608 as TCIs 632 in one or more neighbor relation table (NRT) 630.

The one or more neighbor relation tables (NRT) 630 may be included in and/or managed by the automatic neighbor relation block/module 628. It should be noted that the TCIs 632 included in the neighbor relation table (NRT) 630 may or may not be in the same format as the TCIs 608 sent by a UE 602. More specifically, the eNB 618 may add other information to and/or change the format of the received TCIs 608 to produce TCIs 632 in the neighbor relation table 630. For example, the TCIs 632 may be used for "neighbor relations" (NRs) corresponding to target cell identifiers (TCIs) for cells/sectors detected by one or more UEs 602, "No Remove" indicators, "No HO" (e.g., No Handover) indicators and/or "No X2" indicators. For example, a "No Remove" indicator indicates whether the neighbor relation (NR) may be removed from the neighbor relation table (NRT) 630, the "No HO" indicator indicates whether the neighbor relation may be used for handover reasons and the "No X2" indicator indicates whether an X2 interface 688 may be used in order to initiate procedures towards the eNB 618 parenting the target cell. Table (1) illustrates one example of a neighbor relation table (NRT) 630.

TABLE (1)

| NR | TCI | No Remove | No HO | No X2 |
|---|---|---|---|---|
| 1 | TCI #1 | X | | |
| 2 | TCI #2 | | X | |
| 3 | TCI #3 | X | | X |

In Table (1), the "NR" column includes neighbor relation indices, the "TCI" column includes target cell identifiers (TCIs) 632, the "No Remove" column indicates whether the corresponding neighbor relation (NR) is permitted to be removed from the neighbor relation table (NRT) 630, the "No HO" column indicates whether the neighbor relation (NR) may be used for handover purposes and the "No X2" column indicates whether an X2 interface 688 may be used in order to initiate procedures towards the eNB 618 parenting the target cell. It should be noted that fewer or more rows than are illustrated in Table (1) may be used in a neighbor relation table (NRT) 630. It should be noted that the "No Remove," "No HO" and/or "No X2" may be determined or configured using an operation and maintenance (OAM or O&M) function. Operation and maintenance functionality may be provided separately from an eNB 618, a central unit 646, a serving gateway and/or combinations thereof. Operation and maintenance functionality may be locally and/or remotely provided.

In some configurations, the neighbor relation table(s) (NRT) 630 may also include extended information 634. The extended information 634 may be based on other information 610 received from one or more UEs 602. For example, the extended information 634 may include information regarding communication conditions and/or other information. In one configuration, the extended information 634 may include rank or rankings 682, channel quality indicators (CQIs) 680, reference signal received power (RSRP) measurements 678 and/or corresponding user equipment identifiers (UE IDs) 676. The neighbor relation table(s) 630 may further include information and/or be structured based on the TCIs 632 in conjunction with extended information 634 in some configurations. For example, an eNB 618 (e.g., automatic neighbor relation block/module 628) may generate a rank or rankings 682 for the TCIs 632 (and/or extended information 634) based on the extended information 634. For instance, cells/sectors (as indicated by the TCIs 632) may be ranked based on corresponding channel conditions/measurements (e.g., CQI 680 and/or RSRP 678) included in the extended information 634. One example of a neighbor relation table (NRT) 630 with extended information 634 (residing on an eNB 618) is illustrated in Table (2).

TABLE 2

| NR | TCI | No Remove | No HO | NO X2 | UE IDs/CQI | | |
|----|-------|-----------|-------|-------|-----------|-----------|-----------|
| 1 | TCI #1 | X | | | UE1/CQI1 | UE3/CQI3 | UE4/CQI4 |
| 2 | TCI #2 | | X | | UE2/CQI2 | UE3/CQI3 | UE5/CQI5 |
| 3 | TCI #3 | X | | | UE3/CQI3 | UE2/CQI2 | UE4/CQI4 |

In Table (2), the "NR" column includes neighbor relation indices, the "TCI" column includes target cell identifiers (TCIs) 632, the "No Remove" column indicates whether the corresponding neighbor relation (NR) is permitted to be removed from the neighbor relation table (NRT) 630, the "No HO" column indicates whether the neighbor relations (NRs) may be used for handover purposes and the "No X2" column indicates whether an X2 interface 688 may be used in order to initiate procedures towards the eNB 618 parenting the target cell. Furthermore, the UE IDs/CQI columns indicate which UEs 602 have taken corresponding channel quality indicator (CQI) 680 measurements. In the NRT 630 illustrated in Table (2), the TCIs 632 are also ranked, with the higher-ranked TCIs 632 being placed at lower neighbor relation (NR) indices. For instance, the first TCI 632 (e.g., TCI #1) at NR index 1 may be the most preferable, based on corresponding CQI 680 measurements. Of course, neighbor relation table (NRT) 630 with only one additional piece of extended information (e.g., ranking, UE 602 identifiers, channel measurements, etc.) 634 may be deemed an NRT 630 with extended information 634. It should be noted that fewer or more rows than are illustrated in Table (2) may be used in a neighbor relation table (NRT) 630 (with extended information 634).

The one or more eNBs 618 may communicate one or more neighbor relation table (NRT) messages 601 with the central unit 646. In some configurations, multiple neighbor relation table messages 601 may be encoded and/or mapped to one eNB-NRT message 613 for transmission. This encoding and/or mapping may be performed by the communication block/module 620 (e.g., central unit interface 609). Examples of the central unit 646 include one or more computers, servers, gateways, embedded systems, etc. The central unit 646 may include a communication block/module 648 and/or a cluster determination block/module 652. The communication block/module 648 may be used to send cluster identifier messages 603 and/or receive neighbor relation table (NRT) messages 601 based on wired and/or wireless communication. For example, the central unit 646 may communicate information 601, 603 with the one or more eNBs 618 using wired and/or wireless links. For instance, the communication block/module 648 may communicate with (e.g., transmit one or more cluster identifier messages 603 to and/or receive one or more neighbor relation table (NRT) messages 601 from) one or more eNBs 618 using an S1 interface 698, using a central unit interface 611 and/or using an over-the-air (OTA) signaling block/module 605. In the case that wireless communications are used, the central unit 646 may include one or more antennas (not shown).

The communication block/module 648 may provide (received) information 650 to and/or obtain information 650 (for transmission) from the cluster determination block/module 652. For example, the communication block/module 648 may provide one or more neighbor relation table (NRT) messages 654 to the cluster determination block/module 652 that have been received from one or more eNBs 618 (as part of information 650). In some configurations, the communication block/module 648 (e.g., central unit interface 611) may decode and/or de-map multiple neighbor relation table messages 601 from one message (e.g., an eNB-NRT message 613). Additionally or alternatively, the communication block/module 648 may obtain or receive one or more cluster identifiers 656 (as part of information 650) from the cluster determination block/module 652 for transmission to the one or more eNBs 618 as one or more cluster identifier (CLI) messages 603. In some configurations, the communication block/module 648 (e.g., central unit interface 611) may encode and/or map multiple cluster identifier messages 603 to one message (e.g., an eNB-CLI message 615) for transmission to one or more eNBs 618.

The cluster determination block/module 652 may be used to determine one or more cluster identifiers 656. For example, the cluster determination block/module 652 may determine cluster identifiers 656 based on the neighbor relation table (NRT) message 654. The cluster identifier(s) 656 may be used to indicate which cells/sectors are or should be clustered. The central unit 646 may transmit the cluster identifier(s) 656 to one or more eNBs 618 as one or more cluster identifier messages 603.

One or more eNBs 618 may receive one or more cluster identifiers 640 from the central unit 646 (as one or more cluster identifier message(s) 603). This cluster identifier(s) 640 may be provided to the cooperation block/module 638 (as part of information 694, for example). The cooperation block/module 638 may use the cluster identifier(s) 640 to cooperate with other eNBs 618. In other words, cells/sectors of the one or more eNBs 618 may be clustered based on the cluster identifier(s) 640.

eNBs 618 that provide clustered sectors/cells may operate cooperatively. For example, eNBs 618 with clustered cells/sectors may operate cooperatively to communicate with a UE 602 (assuming the UE 602 can communicate with the two or more eNBs 618 with clustered cells/sectors). For instance, the cooperation block/module 638 may use the cluster identifier(s) 640 to coordinate communications (between the eNBs 618 and a UE 602, for example) with the other eNBs 618. More specifically, the cooperation block/module 638 may generate information or instructions (e.g., "coordination information") used to coordinate communications with other eNBs 618. The cooperation block/module 638 may provide this coordination information (as part of information 696) to the communications block/module 620 for transmission to one or more other eNBs 618. For example, this coordination information may be signaled to one or more other eNBs 618 using an X2 interface 688 and/or an over-the-air (OTA) signaling block/module 692. The eNB 618 may additionally or alternatively receive coordination information from other eNBs 618. This received coordination information may be used to coordinate communications with a UE 602 with one or more other eNBs 618. For instance, this received coordination information may be provided to the cooperation block/module 638 for this purpose (as part of information 694, for example).

Interest in Cooperative Multipoint (CoMP) technologies has recently increased in cellular communications research and standardization bodies such as in 3GPP Release-9. The systems and methods disclosed herein may be applied to Long-Term Evolution-Advanced (LTE-Advanced) system design. According to the systems and methods disclosed herein, with CoMP technologies, several eNBs 618 and/or cells cooperate with each other in order to properly handle the interference that especially cell-edge UEs 602 suffer from. CoMP may be applied to eNBs, sectors and/or cells. As follows, the systems and methods disclosed herein will be explained in terms of eNBs 618 (e.g., eNBs 618, base stations, etc.). To manage a network where several eNBs 618 cooperate with each other, it may be advantageous to group eNBs 618 into clusters and use CoMP technologies within each cluster. "Cooperation" may mean that eNBs 618 belonging to the same cluster exchange any UE 602 data and the required control signaling for the CoMP techniques applied (via an X2 interface 688, an S1 interface 690, a central unit interface 609 and/or over-the-air (OTA) signaling 692, for example), within the cluster.

The general problem addressed by the systems and methods disclosed herein is to determine clusters of eNBs 618 in a network to allow for cooperation between eNBs 618. This may be applied to 3GPP Release-9 standards. In particular, dynamic (due to UE 602 movement) UE-aware clustering of eNBs 618 in the network may be realized according to the systems and methods herein rather than a static or pre-computed clustering without any adaptation to the network situation. "Dynamic" clustering may mean mid-to-long term re-calculation of clusters. "UE-aware" clustering may mean to take the locations of the UEs 602 and their specific radio environment into account to form clusters of eNBs 618 (e.g., cells and/or sectors). The systems and methods disclosed herein for clustering allows taking applied CoMP technologies into account in forming clusters. The systems and methods disclosed herein may be applied to established radio bearers/calls.

Sets of eNBs 618 of an entire network may be grouped in "top clusters" that are pre-computed and static. A central unit (CU) 646 may control a top cluster and may be connected via an interface with the eNBs 618 (e.g., via an S1 interface 698 for a central unit 646 residing in a Serving Gateway (SGW)). Dynamic (sub-) clustering within each top cluster may be performed, which means that groups of eNBs 618 (e.g., cells/sectors) are determined that belong to a top cluster by exploiting the location and/or interference situation of UEs 602.

The systems and methods disclosed herein may combine clustering for Cooperative Multipoint (CoMP) with self-organizing network (SON) technologies. For example, 3GPP Release 8 discusses SON technology and automatic neighbor relations (ANR). With ANR, an ANR block/module 628 resides in an eNB 618 and manages a neighbor relation table (NRT) 630. The NRT 630 may contain information about target cells according to target cell identifier (TCI) 632. The one or more TCIs 608 are delivered by UEs 602 based on UE 602 measurements. A TCI 632 contains information about the best base station (e.g., eNB) 618 neighbors of an eNB 618 that acts as the serving cell for the measuring UEs 602. The ANR block/module 628 provides an up-to-date NRT 630 per eNB 618.

The systems and methods disclosed herein introduce a Cluster Identifier (CLI) 656, 640 that represents information about which eNBs 618 have to form a cluster. The central unit 646 may compute the cluster identifiers 656 by encoding TCIs. The systems and methods disclosed herein allow the transmission of any kind of information of the NRT 630 to the central unit 646 by means of NRT messages 601. An NRT message 601 may include the entire NRT 630, the TCI 632 list of the NRT 630 or part of the TCI 632 list. NRT messages 601 may only be sent by eNBs 618 if needed. The central unit 646 (re-)computes the cluster identifier(s) 656 using NRT messages 654. The computation of the cluster identifier(s) 656 may be performed using any suitable algorithm.

The systems and methods disclosed herein introduce a cluster identifier message 603 that may be sent from the central unit 646 to the eNBs 618. The cluster identifier message 603 may be used to report the computed cluster identifier(s) 656. The cluster identifier message 603 indicates to an eNB 618 the eNBs 618 with which it has to cooperate. The cluster identifier messages 603 may only be transmitted to eNBs 618 if re-clustering is being (e.g., needs to be) performed. Receiving one or more cluster identifier messages 603, the eNBs 618 may start procedures to communicate via X2 688, S1 690 and/or central unit interfaces 611 to re-cluster the network.

Some benefits of the systems and methods disclosed herein may include fully re-using self-organizing network (SON) automatic neighbor relation functionality, which may relieve an operator from the burden of manually clustering the network. Also, SON concepts allow for self-optimization in the sense of clustering eNBs 618 without intervention by an operator through operation and maintenance (OAM or O&M). Furthermore, using the automatic neighbor relation (ANR) update procedure of neighbor relation tables (NRTs) 630 for clustering may ensure that clustering is based on mid-to-long term information about the current neighbor situation of UEs 602. This facilitates dynamic and UE-aware clustering. The systems and methods disclosed herein may also allow a hybrid clustering approach. For example, static or precomputed top clustering reduces complexity while dynamic and UE-aware clustering within the top cluster includes up-to-date UE 602 location information. Dynamic clustering may use LTE Release 8 call procedures such as reference signal received power/quality (RSRP/RSRQ). Hence, the systems and methods disclosed herein may exploit interference situations that the UEs 602 are suffering. It should be noted that mid-to-long term dynamic re-clustering (rather than static) may lead to increased performance for Cooperative Multipoint (CoMP) technologies. Furthermore, no additional control signaling may be required on a capacity-restrictive air interface for clustering. Also, no additional measurements may be required on the radio air interface. Additionally, updates on clustering may be based on normal call procedures since the update of the neighbor relation table (NRT) is based on normal call procedures (according to 3GPP specifications, for example).

Although Cooperative Multipoint (CoMP) is currently a study item in 3GPP, some proposals submitted address or assume static clustering. Furthermore, the 3GPP submissions so far assume central approaches where a central unit has information of the entire network available.

It should be noted that the network-defined and UE-assisted clustering disclosed in one 3GPP document is a semi-static clustering method of which the network can pre-define a set of cluster patterns and the selection of the cluster for a given UE is based on feedback information (e.g., RSRP reports). In that case, each UE forms its own cluster and no self-organizing network (SON) functionalities are used for clustering. So-called "dynamic clustering" is discussed in a 3GPP document. However, "dynamic clustering" therein means simply to exploit UE measurements. Nevertheless, that document does not provide details about which UE measurements are used, nor how this information is used in the network. Furthermore, with that "dynamic clustering," each UE optimizes its own cluster. However, the systems and methods disclosed herein "optimizes" or determines clustering with respect to all UEs 602 and eNBs 618 belonging to fixed top clusters.

In order to manage a network of cooperating nodes with low complexity, grouping nodes into clusters and allowing cooperation between nodes belonging to a cluster may be beneficial. As described above, neighbor relation tables (NRT) 630 residing in eNBs 618 may be used to form clusters. In particular, a central unit (CU) 646 may determine or calculate clusters (in any timely fashion). As described above, forward and return messages between eNBs 618 and the central unit 646 may be used to perform the clustering. Furthermore, the systems and methods disclosed herein allow transmitting any kind of information of the neighbor relation table (NRT) to the central unit 646 by means of NRT messages 601. As described previously, an NRT message 601 may include the entire NRT 630, a target cell identifier (TCI) 632 list of the NRT 630, or a part of the TCI 632 list. The NRT 630 as defined in 3GPP specifications may be used for this purpose.

However, the systems and methods disclosed herein allow the neighbor relation table (NRT) (as defined in 3GPP specifications) to be extended by any attributes that are useful for improving clustering decisions. Examples of such attributes may include a rank or ranking 682 of the TCIs 632 in each NRT 630. Since each eNB 618 may have its own NRT 630, the rank or ranking 682 indicates the neighbor eNBs 618 (or cells/sectors, etc.) that are preferable for cooperation. The rank or ranking 682 may be based on UE 602 measurements. In some configurations, the TCI 632 may be generated by UE 602 measurements as described above. However, with the NRT as defined in 3GPP specifications, the central unit 646 has no knowledge about the UEs 602 that performed the measurements. That is, the central unit 646 would have no knowledge at all about UEs 602 involved if the NRT as defined in 3GPP specifications is used. The systems and methods disclosed herein may extend NRTs 630 by listing UE identifiers (IDs) 676 (e.g., the Cell-Radio Network Temporary Identifier (C-RNTI)) of the UEs 602 that were involved in determining the respective TCI 632 entries of the NRT 630. Additionally or alternatively, any additional quality information of the channel between a UE 602 and an eNB 618 may be included in the NRT 630. This may improve clustering algorithms (though at the expense of higher signaling effort between eNBs 618 and the central unit 646). It should be noted that extended NRTs 630 may not only include UE 602 information about UEs 602 that are using any CoMP technology. Also, UE 602 measurements and respective UE identifiers (IDs) 676 of UEs 602 that are not in "CoMP-mode" may be included in the NRT 630.

One benefit of the systems and methods disclosed herein is to deliver further detailed information on neighboring list attributes to improve the clustering for Cooperative Multipoint (CoMP) technologies. In general, the central unit 646 may be provided further information that can be exploited to calculate the clusters. Some (additional) benefits of the systems and methods disclosed herein are given as follows. The TCIs 632 may be ranked. More specifically, the central unit 646 may obtain an indication of which eNBs 618 are preferred. This may be accomplished by the eNB 618 sending a TCI 632 list using NRT messages 601 to the central unit 646. This information may be used by the central unit 646 (in an algorithm, for example) to obtain better (re-)clustering determinations or decisions. The extension of the NRT 630 using UE identifiers (IDs) 676 may be beneficial. If the central unit 646 knows which UEs 618 indicated an eNB 618 to be preferable (for the UEs 618 to be connected to), then the central unit 646 may use this information to better perform clustering. "Better clustering" may mean improved decisions in the sense of performing re-clustering only if necessary, avoiding some control signaling and/or increasing Cooperative Multipoint (CoMP) performance.

More detail on one example of the systems and methods disclosed herein is now given as follows. The systems and methods disclosed herein deal with the clustering of cells to perform Cooperative Multipoint (CoMP) transmission. The systems and methods disclosed herein may be applied to LTE-Advanced (e.g., 3GPP Release 10 and beyond). In general, cells being grouped to a cluster (e.g., eNBs 618) cooperate their transmissions with each other to manage inter-cell interference that cell-edge UEs 602 may suffer from. The systems and methods disclosed herein may apply self-organizing network (SON) functionality and automatic neighbor relation (ANR) functionality (e.g., as specified in 3GPP LTE Release 9) to implement cell clustering. In particular, the systems and methods disclosed herein introduce a control signaling concept that uses the neighbor relation table (NRT) 630 of a cell which is controlled by the ANR block/module 628. Since ANR functionality uses normal call procedures (including UE 602 measurements) the NRT 630 may contain up-to-date information about neighbor locations. This information may be exploited in the calculation of clusters, which results in dynamic and UE-aware clustering. As follows, the signaling concept is described, followed by a description of control messages and an architectural concept used to perform clustering.

With Cooperative Multipoint (CoMP), several cells of the Evolved UMTS (Universal Mobile Telecommunications System) Terrestrial Radio Access Network (E-UTRAN) cooperate their transmissions with UEs 602 in order to handle the interference that cell-edge UEs 602 suffer from. To manage a network where several cells cooperate, it is advantageous to group cells into clusters and to perform within each cluster the CoMP technologies. Cooperation between cells may mean that cells belonging to the same cluster exchange any user data and the required control signaling for the CoMP techniques applied. This exchange within a cluster of cells may be either via any backplane link between cells of one eNB 618 or if information has to be exchanged between eNBs 618 (e.g., using an X2 interface 688, S1 interface 690, central unit interface 609 and/or over-the-air (OTA) signaling 692.

Challenges to be addressed in context with clustering are (1) to design clustering that, for instance, calculates clusters in some ("optimum") manner by exploiting information about the network and the radio channel, (2) to design the related control signaling that reliably provides information on time, and (3) to design the overall architectural framework to implement the overall clustering.

Since Cooperative Multipoint (CoMP) technologies primarily are designed to optimally manage interference by taking time-varying radio channel conditions into account, a clustering algorithm classified to be "optimum" may also exploit the time-varying radio channel conditions for the calculation of clusters (it should be noted that the term "optimum" herein may or may not denote actual best performance possible). Drawbacks may include higher algorithmic complexity and increased control signaling on the radio and X2 688 interfaces. Some prior approaches address static/fixed clustering, where clusters are pre-defined without consideration of any radio channel conditions and the clusters are fixed over time. A network-defined and UE-assisted clustering method described in 3GPP documentation is a semi-static clustering method of which the network can pre-define a set of cluster patterns and the selection of the cluster for a given UE based on the feedback information, (e.g., Reference Signal Received Power (RSRP) reports). So-called "dynamic clustering" is described in a 3GPP document (R1-090657). Therein, "dynamic clustering" means to exploit UE measurements. However, no details are given about which UE measurements are used, nor how this information is processed in the network.

One example of the systems and methods disclosed herein introduces the application of self-organizing network (SON) functionalities as specified in 3GPP Release 9 to enable clustering of cells. In particular, self-organizing network (SON) functionality (e.g., called an automatic neighbor relation (ANR) function) may be used. In particular, 3GPP Release 9 discusses the SON technology ANR that manages the neighbor relation table (NRT). For each cell of the eNB 618, the eNB 618 keeps a NRT 630. An NRT 630 may thus be cell-specific and may contain information about the best cell neighbors of that cell. As defined in 3GPP specifications, an NRT 630 is based on measurements performed by UEs 602 as part of a normal call procedure. As a result, the NRT 630 (or the information contained in an NRT 630) may be exploited by a clustering algorithm to perform UE-aware and dynamic clustering. "Dynamic clustering" may mean mid-to-long term re-calculation of clusters. "UE-aware" may mean taking the locations of the UEs 602 and their specific radio environment into account to form clusters of cells. It should also be noted that by using the NRT 630, clustering is "optimized" with respect to all UEs 602 and cells involved in the cluster calculation as opposed to perform clustering where each UE "optimizes" its own cluster. Finally, note that self-organizing network (SON) technologies may relieve an operator from the burden of manually clustering the network (e.g., clustering may be performed without intervention by the operator through operation and maintenance (O&M).

The control signaling concept, control messages and an architectural concept for performing clustering are described. The systems and methods disclosed herein for clustering allow taking applied Cooperative Multipoint (CoMP) technologies into account in forming clusters. Moreover, the described clustering approach may be applied for established radio bearers/calls.

This example may be organized as follows. The automatic neighbor relation (ANR) function and the neighbor relation table (NRT) 630 are described first. Next, the proposed application of the self-organizing network (SON) functionality ANR to enable clustering is explained in detail. Details about control signaling are given and basic architectural issues are addressed. Some more specific examples of NRT extensions with the objective to improve clustering (in the sense of obtaining better performance for the CoMP technologies applied) are then given. Then, some of the benefits and properties of self-organizing network (SON) are described. Finally some main aspects of this example are summarized.

As follows, the automatic neighbor relation (ANR) function is briefly described. Furthermore, a neighbor relation in the context of an ANR is explained, and a neighbor relation table (NRT) as defined in 3GPP specifications is described.

The general purpose of a self-organizing network (SON) may be to relieve an operator from the burden of manually managing the network (via operations and maintenance (O&M), for example). Thus, ANR functionality has been designed in the way that Neighbor (cell) Relations (NRs) are self-managed by the network. An ANR function, its specific sub-functions and the interaction with the operations and maintenance (O&M) are described in 3GPP specifications. 3GPP specifications describe interaction between an eNB and operations and maintenance (O&M) due to ANR functionality.

The ANR block/module 628 resides in the eNB 618 and manages the neighbor relation table (NRT) 630. One sub-function of the ANR block/module 628 is a Neighbor Detection Function that finds new neighbors and adds them to the NRT 630. Moreover, to remove outdated neighbor relations, the ANR block/module 628 also contains a Neighbor Removal Function. Both sub-functions, the Neighbor Detection and the Neighbor Removal Function may be implementation-specific.

One definition of what is meant by a neighbor relation (NR) in the context of the ANR functionality is given as follows. A neighbor relation is defined between a source cell and a target cell, whereas a source cell is controlled by an eNB 618. A neighbor relation may exist if the eNB 618 controlling the source cell (1) knows the E-UTRAN Cell Global Identifier (ECGI or CGI) and Physical Cell Identifier (PCI) of the target cell, (2) has an entry in the neighbor relation table 630 for the source cell identifying the target cell, and (3) has the attributes in this neighbor relation table entry defined (either by operations and maintenance (O&M) or as set to default values).

For each cell (e.g., sector) of an eNB 618, the eNB 618 may keep an NRT 630. One example of an NRT 630 is illustrated in Table (1) above. It can be seen that for each existing neighbor relation (NR) there is its entry in the NRT (row) 630 that contains the target cell identifier (TCI) 632. The TCI 632 identifies the target cell, and (for E-UTRAN) the TCI 632 corresponds to the E-UTRAN Cell Global Identifier (ECGI) and Physical Cell Identifier (PCI) of the target cell.

In this example, an eNB 618 instructs each UE 602 to perform measurements on neighbor cells to obtain the TCI 608. This procedure is part of the normal call procedure as specified in 3GPP specifications. The eNB 618 may use different policies for instructing the UE 602 to do measurements and when to report them to the eNB 618. By using NRT 630 entries, mid-to-long term UE-specific information may be taken into account. Beside the TCI 632, other information 610 such as channel state information may be reported by the UE 602 to the eNB 618 to improve clustering performance. This is described in further detail below.

As illustrated in Table (1) above, each neighbor relation (NR) entry has three attributes: the "No Remove," the "No HO" and the "No X2" attributes. It should be noted that these attributes may be controlled by operations and maintenance (O&M). These attributes may be defined as follows. If the "No Remove" attribute is checked, the eNB 618 shall not remove the neighbor relation (NR) from the neighbor relation table (NRT) 630. If the "No HO" attribute is checked, the neighbor relation (NR) shall not be used by the eNB 618 for handover reasons. If the "No X2" attribute is checked, the neighbor relation (NR) shall not use an X2 interface 688 in order to initiate procedures towards the eNB 618 parenting the target cell. It should be noted that, according to the systems and methods disclosed herein, more information may be added to a neighbor relation entry.

It should be noted that neighbor relations (NRs) are cell-to-cell relations, while an X2 link is set up between two eNBs 618. Moreover, neighbor relations (NRs) may be unidirectional, while an X2 link may be bidirectional. In order to enable controlling of the ANR functionality by the operator, the ANR block/module 628 has an interface to operation and maintenance (O&M) functionality. By using the operation and maintenance (O&M) functionality, an operator may manually add and delete neighbor relations (NRs) if needed. In addition, the operation and maintenance (O&M) functionality also allows for changing the attributes of the NRT 630. Also, the operation and maintenance (O&M) function (e.g., block/module) may be informed about changes in the NRT 630 to provide the operator with current neighbor relation (NR) situations.

Control signaling and the architectural framework for this example are now described in greater detail. To manage clustering of an entire network with a large number of cells with acceptable complexity, a set of cells may first be grouped in top clusters that are pre-computed and static. The central unit (CU) 646 controls such a top cluster. The central unit 646 may be located in the Serving Gateway (SGW) of the Evolved Packet System (EPS). It should be noted that the SGW may be configured in accordance with Long Term Evolution (LTE) specifications. For example, the SGW may be part of an enhanced packet core with a Mobility Management Entity (MME) and packet data network (PDN) Gateway, while an eNB 618 may be part of the E-UTRAN.

In another configuration, the central unit (CU) 646 may be located in an Operation and Maintenance (OAM) functionality block/module (e.g., a Network Management block or Network Manager). For instance, an OAM functionality block/module may be located separately from eNBs 618 and/or from an SGW. The OAM functionality block/module may include a Network Management block/module or Network Manager (NM). The CU 646 may be included in the OAM functionality block/module and/or Network Management block/module or Network Manager. It should be noted that the OAM functionality block/module and/or Network Manager may be configured in accordance with Long Term Evolution (LTE) specifications. For example, an eNB 618 may communicate with the OAM and/or NM using an N-interface (Itf-N) (and/or an S-Interface (Itf-S) in the case that a Domain Management/Element Management (DM/EM) block/module is used). As used herein, the term "block/module" (or "block or module") may be used to indicate that an element may be implemented in hardware, software or a combination of both.

In yet another configuration, the central unit 646 may be a separate logical node of the Evolved Packet System (EPS). By using a central unit 646, the clustering method introduced is a central approach. For example, distributed clustering may not be within the scope of the systems and methods disclosed herein. More specifically, the central unit (CU) controls its top cluster in the sense of calculating subsets of cells (e.g., (sub-) clusters), where cells within this subset cooperate with each other to perform Cooperative Multipoint (CoMP) communications. The systems and methods disclosed herein further introduce an interface between the central unit (CU) 646 and each eNB 618 of which cells cooperate with one another. This interface may be called a central unit interface (illustrated as "CU interface" for convenience in FIG. 6) 609, 611. The central unit interface 609, 611 may be bi-directional and links the central unit 646 with one or more eNBs 618.

It may be assumed that all cells of an eNB 618 are grouped to one top cluster, thus avoiding a situation where two cells of one eNB 618 are grouped to different top clusters. This may simplify X2 control signaling for Cooperative Multipoint (CoMP) communications since an X2 link may be set-up between two eNBs 618.

The central unit 646 may calculate the (sub-) clusters using any kind of information from the NRT 630. This information is transmitted by messages via the central unit interface 609 to the central unit 646. This ensures calculation of clusters by utilizing the ANR functionality as described above. As an example, the TCI 632 of the NRT 630 contains up-to-date information about the best cell neighbors of a cell that acts as the serving cell. Thus, the TCI 632 may be transmitted via the central unit interface 609 to the central unit 646 and the central unit 646 uses the TCI 632 to calculate clusters. Note that in addition to the TCI 632, any further entries of the NRT 630 may also be used by the central unit 646 to calculate clusters. This is addressed further below, where the extension of the NRT 630 is described to improve the calculation of clusters.

Managing clustering according to the systems and methods disclosed herein may proceed as follows. An NRT message 601 may be transmitted from the eNB 618 to the central unit 646 via the central unit interface 609. The NRT message 601 may include the entire NRT 630, the TCI 632 list of the NRT 630, a part of the TCI 632 list and/or other information. The NRT message 601 may be cell-specific, since an NRT 630 is cell-specific. Additionally or alternatively, NRT messages 601 of cells belonging to the same eNB 618 may be encoded and mapped to a message 613 (illustrated as an eNB-NRT message 613 for convenience in FIG. 6) that is transmitted via the central unit interface 609 to the central unit 646. An eNB-NRT-message 613 may only be sent by eNBs 618 if needed.

The systems and methods disclosed herein also define a Cluster Identifier (CLI) 640, 656 that represents any identification of cells (e.g., ECGI, CGI, PCI and/or other cell identifier). A Cluster Identifier (CLI) 640, 656 may be defined per cell such that the list reflects the set of cells that the considered cell has to cooperate with. In the case of a master/slave architecture of cells for Cooperative Multipoint (CoMP) communication, the Cluster Identifier (CLI) 640, 656 may also contain information identifying master and slave cells.

The central unit 646 computes the cluster identifiers 640 for all cells belonging to the top cluster. In order to accomplish this, the central unit 646 may decode and de-map the received eNB-NRT messages 613 to NRT messages 654. Based on the content of the NRT messages 654, the central unit 646 computes the cluster identifiers 656. One approach for computing the cluster identifiers 656 is given below.

The central unit 646 may transmit one or more cluster identifier messages 603 (e.g., CLI messages) to one or more eNBs 618 via the central unit interface 611 (illustrated as "CU interface for convenience in FIG. 6). A cluster identifier message 603 may include the computed cluster identifier 603. The cluster identifier message 603 may be cell-specific since the central unit 646 computes a cluster identifier 656 per cell. Cluster identifier messages 603 of cells belonging to the same eNB 618 may be encoded and mapped to a message 615 (illustrated as an eNB-CLI message 615 for convenience in FIG. 6) that is transmitted via the central unit interface 611 to the eNB 618. In the case that eNBs 618 or cells receive global information about (re-)clustering, the encoding and mapping of cluster identifier messages 603 can be applied to any set of cell-specific cluster identifier messages 603. Cluster identifier messages 603 (e.g., eNB-CLI messages 615) may only be transmitted if re-clustering is needed. A cell (e.g., eNB 618) may start procedures to re-cluster the network as soon as it 618 receives a cluster identifier message 603 (e.g., eNB-CLI message 615). This procedure may be carried out according to synchronous and/or asynchronous (re-) clustering.

In the case that the central unit 646 resides in serving gateway (S-GW) of the Evolved Packet System (EPS), the S1 interface 698 may be extended to include the central unit interface 611. However, if the central unit 646 resides in some other device, the central unit interface 611 may be independent. It should be noted that in the case that the central unit 646 resides in an Operation and Maintenance (OAM) functionality block, an "Itf-N" interface may need to be modified.

Given the described control signaling, the systems and methods disclosed herein may use a central approach, where the central unit 646 fully controls the (re-)clustering of cells. However, alternative approaches may be used that partly include eNBs 618 or cells in the decision process (e.g., where an eNB 618 may reject or modify the clustering decision).

Continuing with this example of the systems and methods disclosed herein, some examples of extending the neighbor relation table (NRT) (as defined in 3GPP specifications) by any attributes being useful for improving clustering decisions are described as follows. One example of the attributes is a rank or ranking 682 of the TCIs 632 in each NRT 630. Since each cell has its own NRT 630, the rank or ranking 682 indicates the neighbor cells that are preferable for cooperation. The rank or ranking 682 may be based on UE 602 measurements.

It should be noted that the TCI 632 list may be generated by normal call procedures using UE 602 measurements as described in 3GPP specifications and references therein. However, with the NRT as defined in 3GPP specifications, the central unit 646 would have no knowledge about the UEs 602 that performed the measurements. Thus, the central unit 646 would have no specific knowledge about the UEs 602 involved. Hence, the NRTs 630 may be extended by listing UE IDs (e.g., the Cell-Radio Network Temporary Identifier or C-RNTI) 676 of the UEs 602 that were involved in determining the respective TCI 632 entries of the NRT 630. Since 3GPP Release 8 and Release 9 UEs may not support Cooperative Multipoint (CoMP) communication, additional information may be needed concerning which release is supported by UEs 602 performing the measurements.

Beside UE IDs 676, any additional quality information of the channel between a UE 602 and a cell (e.g., eNB 618) may be included in the NRT 630. This may improve clustering algorithms, but at the expense of higher signaling effort between eNBs 618 and central unit 646. Table (2) above illustrates one example of an "extended" NRT 630. In other words, Table (2) illustrates an NRT 630 with extended information 634 that resides in an eNB 618. One example of extended information 634 is a rank or ranking 682 of TCIs 632. Another example is the inclusion of UE IDs 676 and/or corresponding CQIs 680. It should be noted that "extended" NRTs 630 may not only include UE 602 information about UEs 602 that are using, processing and/or capable of using Cooperative Multipoint (CoMP) technology. Also, UE 602 measurements and respective UE IDs 676 of UEs 602 that are not in "CoMP-mode" may be included in the NRT 630.

Properties of self-organizing network (SON) clustering are described hereafter. That is, some of the main properties of self-organizing network (SON) clustering according to the systems and methods disclosed herein are described as follows. In one configuration, self-organizing network (SON) automatic neighbor relation (ANR) functionality may be re-used by including the update procedure of the NRTs 630 into the clustering procedure. This may relieve an operator from the burden of manually clustering the network (by clustering without operator intervention through Operation & Maintenance (O&M), for example). This may also facilitate dynamic (e.g., mid-to-long-term) and UE-aware clustering.

Another property of self-organizing network (SON) clustering may be a hybrid clustering approach. In this approach, static/pre-computed top clustering may be used, thereby reducing complexity. Dynamic and UE-aware clustering within the top cluster may be used that includes up-to-date UE 602 location information. It should be noted that mid-to-long term dynamic re-clustering (rather than static clustering) may lead to increased performance for CoMP technologies.

In one configuration, self-organizing network (SON) clustering may utilize normal call procedures as specified in 3GPP specifications. This may exploit interference situations that the UEs 602 are suffering. In this configuration, neither additional measurements nor additional control signaling are required on the capacity-limited air interface.

One benefit of extending the neighbor relation table (NRT) 630 as described above is to deliver further detailed information on neighboring list attributes to improve the clustering for Cooperative Multipoint (CoMP) communication. In general, the central unit 646 may obtain and/or be given further information that may be exploited to calculate the clusters. Extending the NRT 630 may provide several benefits. More specifically, the central unit 646 may obtain an indication of which cells (e.g., eNBs 618) are preferred. This may be accomplished by the eNB 618 sending a TCI 632 list using NRT messages 601 to the central unit 646. This information may be used by the central unit 646 (in an algorithm, for example) to obtain better (re-)clustering determinations or decisions. The extension of the NRT 630 using UE identifiers (IDs) 676 may be beneficial. If the central unit 646 knows which UEs 602 indicated an eNB 618 to be preferable (for the UEs 602 to be connected to), then the central unit 646 may use this information to better perform clustering. "Better clustering" may mean improved decisions in the sense of performing re-clustering only if necessary, avoiding some control signaling and/or increasing Cooperative Multipoint (CoMP) performance.

In summary of this example, self-organizing network (SON) automatic neighbor relation (ANR) functionality may be applied to enable dynamic and UE-aware clustering of cells for Cooperative Multipoint (CoMP) communication. The NRT 630 per cell (e.g., the information included in NRTs 630) may be used by a clustering algorithm to calculate clusters of cooperating cells. Some advantages of this approach include dynamic and UE-aware clustering, re-use of call procedures and UE measurements already specified in 3GPP specifications and clustering without operator intervention due to the self-organizing network (SON) automatic neighbor relation (ANR) functionality.

Figure 7:
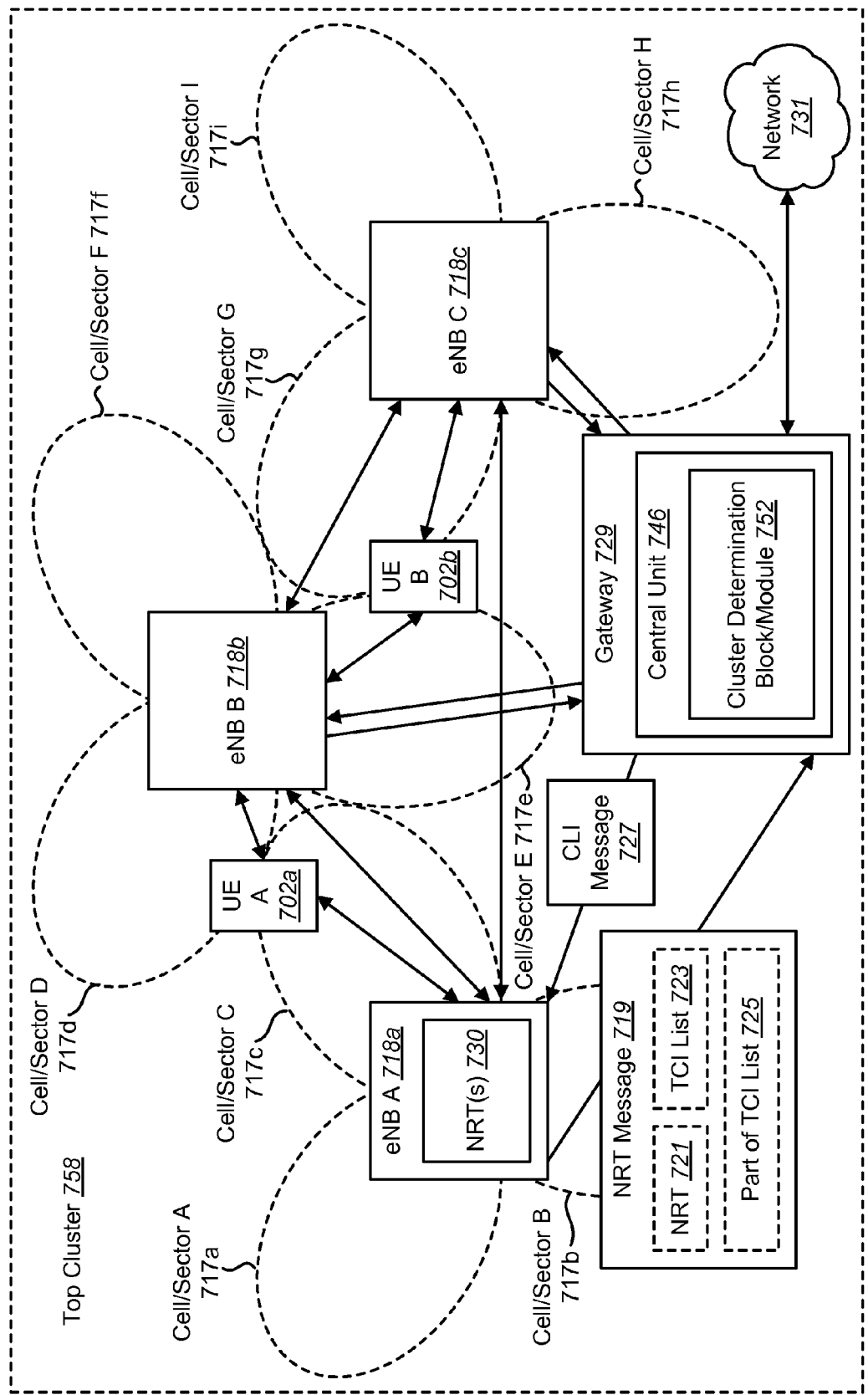
FIG. 7 is a diagram illustrating one example of several evolved Node Bs (eNBs) and a central unit in which systems and methods for cell clustering using neighbor relations may be implemented.

FIG. 7 is a diagram illustrating one example of several evolved Node Bs (eNBs) 718 and a central unit 746 in which systems and methods for cell clustering using neighbor relations may be implemented. As illustrated, several eNBs 718a-c (with their cells/sectors 717a-i) may be included in a top cluster 758. A central unit 746 may also correspond to the top cluster 758. In this example, each eNB 718a-c provides three cells/sectors 717a-i. More specifically, eNB A 718a provides cells/sectors 717a-c, eNB B 718b provides cells/sectors 717d-f and eNB C 718c provides cells/sectors 717g-i.

The eNBs 718a-c may communicate with UEs A-B 702a-b. For example, eNB A 718a may instruct UE A 702a to obtain target cell identifiers (TCIs). UE A 702a may receive and/or measure, for example, TCIs from cell/sector A 717a, cell/sector C 717c, cell/sector D 717d and cell/sector E 717e. UE A 702a may also obtain other measurements, such as channel quality indicators (CQIs), reference signal received power (RSRP), etc. from cells/sectors A 717a and C-E 717c-e. UE A 702a may provide the TCIs, the other measurements and/or a UE identifier to eNB A 718a. eNB A 718a may place the TCIs in one or more neighbor relation tables 730. Additionally or alternatively, eNB A 718a may place one or more of the other measurements and UE identifier in the NRT(s) 730. The TCIs, one or more of the measurements and/or the UE identifier (along with an index and/or other attributes) may constitute a neighbor relation (NR) entry in the NRT 730. In some configurations, eNB A 718a may rank the neighbor relation entries in the table based on one or more UE 702 measurements (e.g., CQI, RSRP, etc.).

eNB A 718*a* may transmit an NRT message 719 to a central unit 746 housed in a gateway 729. One example of the gateway 729 is a Serving Gateway (SGW). The gateway 729 may relay information from one or more eNBs 718*a-c* (and UEs 702*a-b*) to a network 731. Examples of the network 731 may include the Public Switched Telephone Network (PSTN), the Internet, etc. This network 731 should not be confused with a network of base stations (e.g., Node Bs, eNBs, etc.) or cells as described herein. It should be noted that communications between the central unit 746 and one or more of the eNBs 718*a-c* may be carried out using a central unit interface. The NRT message 719 may comprise an entire NRT 721, a TCI list 723, part of a TCI list 725 and/or other information. In one configuration, the NRT message 719 may be an eNB-NRT message, which may comprise (encoded and mapped) NRT messages for the cells/sectors provided by eNB A 718*a* (e.g., cells/sectors A-C 717*a-c*).

The central unit 746 residing on the gateway 729 may receive the NRT 719 from eNB A 718*a*. This may be done using a central unit interface. In the case that the NRT message 719 is an eNB-NRT message, the central unit 746 may decode and/or de-map individual NRT messages included therein. The central unit 746 may use the NRT message 719 to determine clustering for cells/sectors 717 (for eNB A 718*a*, for example). For instance, the central unit 746 may use a cluster determination block/module 752 to determine one or more cluster identifiers (e.g., CLIs) for one or more eNBs 718. For example, assume that the central unit 746 determines that cell/sector C 717*c* and cell/sector D 717*d* should be clustered. The central unit 746 may generate a cluster identifier that indicates this information.

It should be noted that in some configurations, the central unit (CU) 746 may be alternatively located in an Operation and Maintenance (OAM) functionality block (e.g., in a Network Management block or Network Manager (NM)). For instance, an OAM functionality block/module (not illustrated in FIG. 7) may be located separately from eNBs 718 and/or from the gateway 729. The OAM functionality block/module may include a Network Management block/module or Network Manager. The CU 746 may be included in the OAM functionality block/module and/or Network Management block/module or Network Manager (NM). It should be noted that the OAM functionality block/module and/or Network Manager may be configured in accordance with Long Term Evolution (LTE) specifications. For example, an eNB 718 may communicate with the OAM and/or NM using an N-interface (Itf-N) (and/or an S-Interface (M-S) in the case that a Domain Management/Element Management (DM/EM) block/module is used).

In one example, the Network Management block/module or Network Manager (NM) may be a controlling entity of the OAM functionality block/module. The NM may manage the network (and may be supported by Element Management (EM) if used). A Domain Management/Element Management (DM/EM) block/module may provide management functions (e.g., element and domain management functions) for a sub-network. In the case that a DM/EM block/module is used, the DM/EM block/module may relay communications between an eNB 718 and the OAM. The Itf-N may provide a communication connection between an eNB 718 and the OAM and/or between the DM/EM and the OAM (e.g., NM). An Itf-S may optionally be used to provide a (proprietary) connection between an eNB 718 and the DM/EM.

The central unit 746 may transmit one or more cluster identifiers in a CLI message 727 to eNB A 718*a*. In some configurations, a CLI message 727 may comprise an eNB-CLI message, which may include cluster indicators for each of the cells/sectors 717 corresponding to an eNB 718. For example, the central unit 746 may encode and map cluster indicators corresponding to cells/sectors A-C 717*a-c* into an eNB-CLI message 727, which it 746 may transmit to eNB A 718*a*. This transmission may be accomplished using a central unit interface. In one configuration, the central unit interface may be included within an S1 interface on the gateway 729.

eNB A 718*a* may receive the CLI message 727. In the case that the CLI message 727 is an eNB-CLI message 727, eNB A 718*a* may decode and/or de-map the eNB-CLI message. The CLI message 727 may contain one or more cluster identifiers. For instance, assume that a cluster identifier indicates that cell/sector C 717*c* and cell/sector D 717*d* should be clustered. eNB A 718*a* may communicate information with eNB B 718*b* in order to coordinate communications with UE A 702*a*. eNB A 718*a* may use an X2 interface to communicate with eNB B 718*b*.

It should be noted that similar procedures for clustering may be followed by eNB B 718*b* and eNB C 718*c*. For example, eNB B 718*b* and/or eNB C 718*c* may communicate with the central unit 746 in order to cluster cell/sector F 717*f* and cell/sector G 717*g*. eNB B 718*b* and eNB C 718*c* may additionally communicate with each other to coordinate communications with UE B 702*b*.

Figure 8:
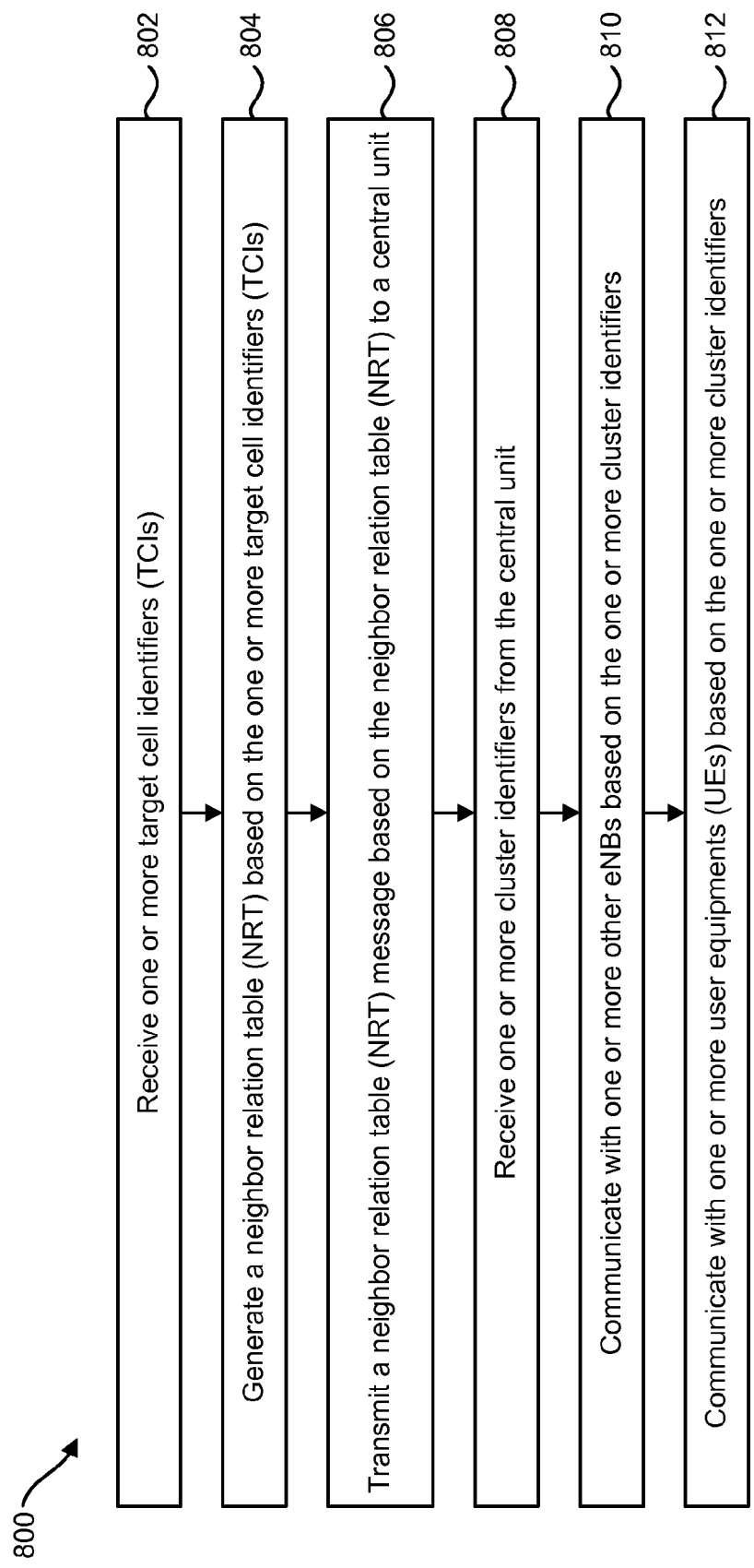
FIG. 8 is a flow diagram illustrating one configuration of a method for clustering cells using neighbor relations.

FIG. 8 is a flow diagram illustrating one configuration of a method 800 for clustering cells using neighbor relations. An eNB 618 may receive 802 one or more target cell identifiers (TCIs) 608 (e.g., ECGI, CGI, PCI and/or other cell identifier) from one or more UEs 602. For example, the TCIs 608 may indicate one or more cells/sectors that a UE 602 is able to detect. It should be noted that in some configurations, the eNB 618 may first send an instruction to one or more UEs 602 requesting TCIs 608.

The eNB 618 may generate 804 a neighbor relation table (NRT) 630 based on the one or more TCIs 632. In one configuration, the neighbor relation table 630 includes information such as TCIs 632 and information associated with the indicated cells/sectors. It should be noted that the neighbor relation table 630 may include information that is received from the one or more UEs 602 and/or information that the eNB 618 generates (based on the received information).

The eNB 618 may transmit 806 a neighbor relation table (NRT) message 601 based on the NRT 630 to a central unit 646. For example, the neighbor relation message may include the entire NRT 630, part of the NRT 630 and/or some other information based on the NRT 630. For instance, the NRT message 601 may include a list of TCIs 632.

The eNB 618 may receive 808 one or more cluster identifiers (e.g., CLIs) 640 from the central unit 646. The cluster information 640 may indicate which cells/sectors should be clustered. For example, the cluster information 640 may indicate which eNBs 618 should coordinate with each other to communicate with one or more UEs 602. Accordingly, the eNB 618 may communicate with another eNB 618 to coordinate communications with one or more UEs 602. In one configuration, coordinating communications between eNBs 618 and a UE 602 may be referred to as Cooperative Multipoint (CoMP) communications.

The eNB 618 may communicate 810 with one or more other eNBs 618 based on the one or more cluster identifiers 640. For example, an eNB 618 may send information to and/or receive information from another eNB 618 in order to coordinate communications with a UE 602. In one configuration, this communication 810 may be carried out using an X2 interface 688. The information communicated with the other eNB 618 may include scheduling information so that both eNBs 618 may communicate with the UE 602.

The eNB 618 may communicate 812 with one or more UEs 602 based on the cluster information 640. For example, the eNB 618 may transmit information to and/or receive information from a UE 602 based on the cluster information 640. For instance, if a UE 602 can communicate with two eNBs 618, where the eNBs 618 provide cells/sectors that are clustered, then the eNB 618 may communicate with the UE 602 as it 618 coordinates with the other eNB 618 (with the clustered cell/sector).

Figure 9:
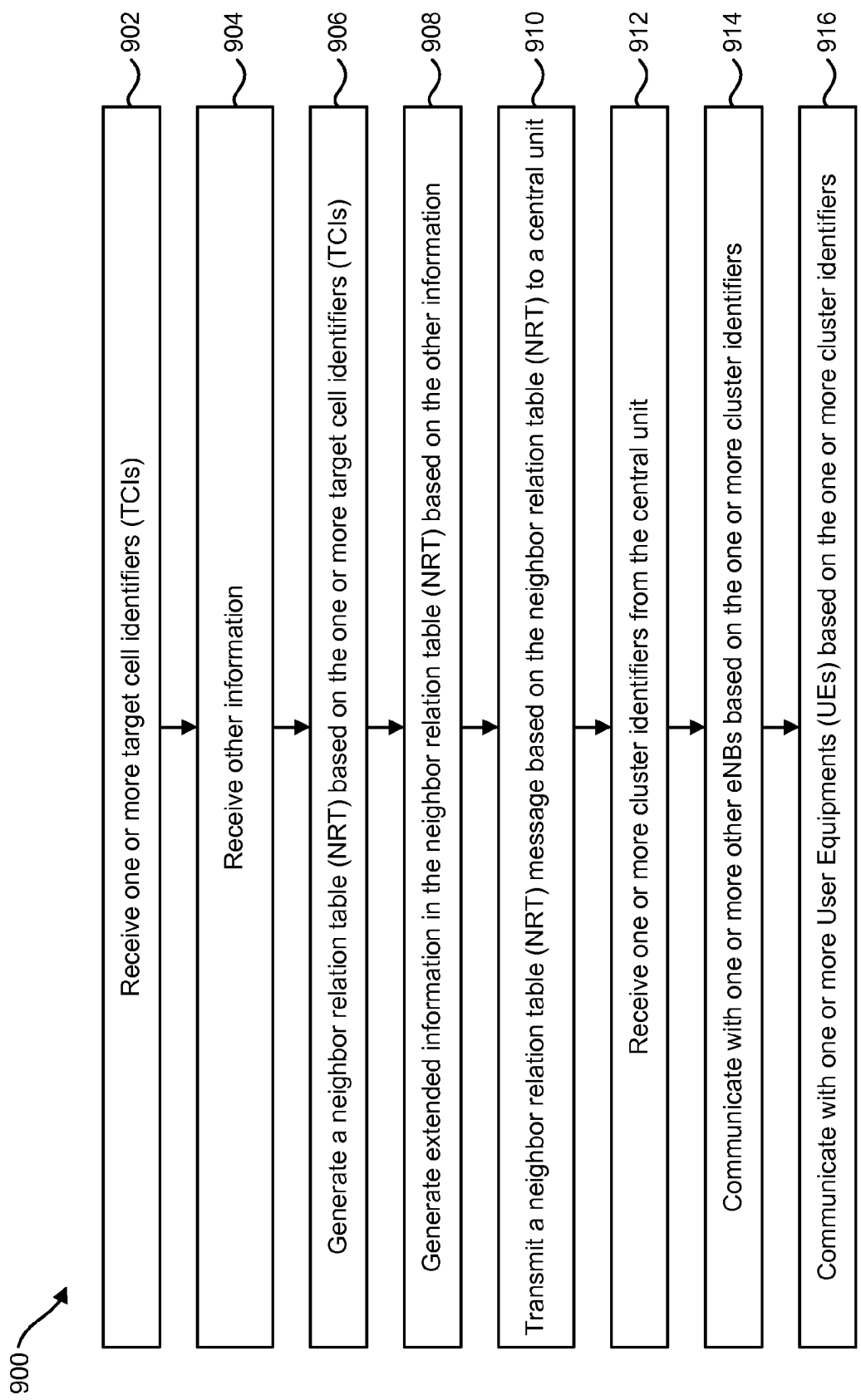
FIG. 9 is a flow diagram illustrating another configuration of a method for clustering cells using neighbor relations.

FIG. 9 is a flow diagram illustrating another configuration of a method 900 for clustering cells using neighbor relations. An eNB 618 may receive 902 one or more target cell identifiers (TCIs) 608 from one or more UEs 602. For example, the one or more TCIs 608 may indicate one or more cells/sectors that a UE 602 is able to detect. It should be noted that in some configurations, the eNB 618 may first send an instruction to one or more UEs 602 instructing the UE 602 to obtain one or more TCIs 608.

The eNB 618 may receive 904 other information 610. For example, the eNB 618 may receive 904 other information 610 from one or more UEs 602. In one configuration, other information 610 may include information regarding communication conditions, a UE identifier (e.g., UE ID) 676 and/or other information. For instance, the other information 610 may include reference signal received power (RSRP) 678, channel quality indicator(s) (CQI) 680, a user equipment identifier (UE ID) 676 and/or other information.

The eNB 618 may generate 906 a neighbor relation table (NRT) 630 based on the one or more TCIs 632. In one configuration, the neighbor relation table 630 includes information such as TCIs 632 and information associated with those cells/sectors. It should be noted that the neighbor relation table (NRT) 630 may include information that is received from the one or more UEs 602 and/or information that the eNB 618 generates (based on the received information).

The eNB 618 may generate 908 extended information 634 in the NRT 630 based on the other information 610. In one configuration, the eNB 618 adds received information to the neighbor relation table 630 such as one or more UE identifiers 676, information regarding channel conditions, etc. For instance, the eNB 618 may add one or more user equipment identifiers (UE IDs) 676, channel quality indicators (CQIs) 680 and/or reference signal received power (RSRP) measurements 678, etc. The eNB 618 may additionally or alternatively generate a rank or rankings 682 for the cells/sectors indicated in the neighbor relation table 630. For example, the eNB 618 may rank the cells/sectors in the neighbor relation table 630 based on channel condition information. In one configuration, generating rankings 682 may entail sorting the neighbor relation table 630 with the higher ranked cells/sectors in a particular position (e.g., the top of the table). In another configuration, the eNB 618 may generate numerical rankings 682 that may be included in the neighbor relation table 630.

The eNB 618 may transmit 910 a neighbor relation table (NRT) message 601 based on the neighbor relation table 630 to a central unit 646. For example, the neighbor relation message 601 may include the entire neighbor relation table 630, part of the neighbor relation table 630 and/or some other information based on the neighbor relation table 630. For instance, the neighbor relation message 601 may include a list of TCIs 632. It should be noted that rankings 682 may be implicitly indicated, for example, by the order in which the list of cells/sectors are placed in the neighbor relation table 630 and/or in the neighbor relation message 601. In some configurations, each of the neighbor relation messages 601 corresponding to cells from an eNB 618 may be encoded and/or mapped to a message (e.g., eNB-NRT message 613).

The eNB 618 may receive 912 one or more cluster identifiers 640 from the central unit 646. The one or more cluster identifiers 640 may indicate which cells/sectors should be clustered. For example, the cluster identifiers 640 may indicate which eNBs 618 should coordinate with each other to communicate with one or more UEs 602. In some configurations, the eNB 618 may decode and/or de-map cluster identifier messages 603 corresponding to each of the eNB's 618 cells/sectors.

The eNB 618 may communicate 914 with one or more other eNBs 618 based on the one or more cluster identifiers 640. This may be done in order to coordinate communications with one or more UEs 602. For example, the eNB 618 may communicate 914 scheduling information with another eNB 618 for communicating with a UE 602 located in a cluster of cells/sectors of the two eNBs 618. In one configuration, coordinating communications between eNBs 618 and a UE 602 may be referred to as Cooperative Multipoint (CoMP) communications.

The eNB 618 may communicate 916 with one or more UEs 602 based on the one or more cluster identifiers 640. For example, the eNB 618 may transmit information to and/or receive information from a UE 602 based on the cluster information 640. For instance, if a UE 602 can communicate with two eNBs 618, where the eNBs 618 provide cells/sectors that are clustered, then the eNB 618 may communicate 916 with the UE 602 as it 618 coordinates with the other eNB 618 (with the clustered cell/sector).

Figure 10:
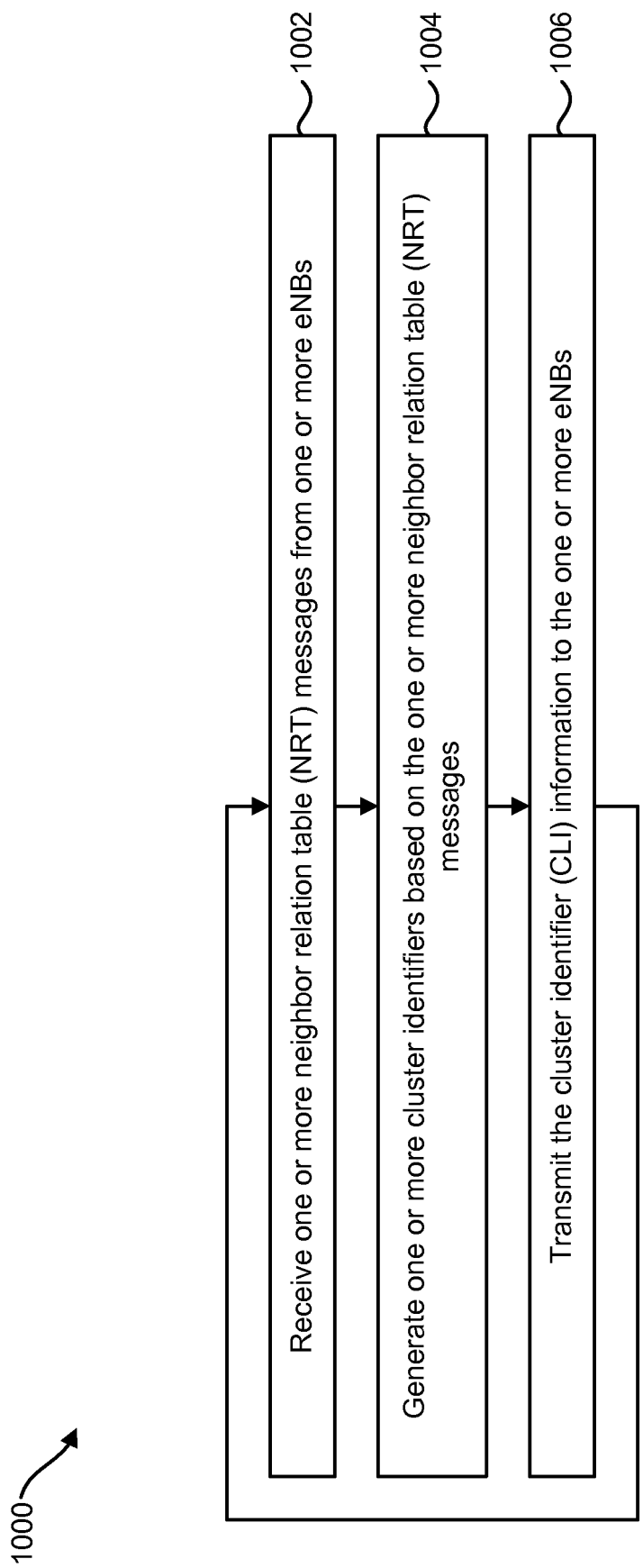
FIG. 10 is a flow diagram illustrating another configuration of a method for clustering cells using neighbor relations.

FIG. 10 is a flow diagram illustrating another configuration of a method 1000 for clustering cells using neighbor relations. A central unit 646 may receive 1002 one or more neighbor relation table (NRT) messages 601 from one or more eNBs 618. In one configuration, the central unit 646 receives the one or more neighbor relation table (NRT) messages 610 using an S1 interface 698 and/or over-the-air (OTA) signaling 605. The central unit 646 may additionally or alternatively use a central unit interface 611 for sending/receiving information to/from one or more eNBs 618. For instance, the communication block/module 648 may receive 1002 the one or more neighbor relation table (NRT) messages 601, which may be provided to the cluster determination block/module 652. In some configurations, the central unit 646 may receive 1002, decode and/or de-map a message (e.g., eNB-NRT message 613) with NRT messages 601 for each of the cells/sectors corresponding to an eNB 618.

The central unit 646 may generate 1004 one or more cluster identifiers 656 based on the one or more neighbor relation table (NRT) messages 601 (and/or eNB-NRT messages 613). It should be noted that the neighbor relations messages 601 (and/or eNB-NRT messages 613) may be based on cell information 632 and/or extended information 634. For example, the neighbor relation table (NRT) messages 601 may include information such as TCIs 632, UE identifiers 676, channel condition information, a rank or rankings 682 and/or other information, etc. In one configuration, the central unit 646 may generate 1004 one or more cluster identifiers 656 based only on cell/sector identifiers (e.g., TCIs 632). In other configurations, the central unit 646 may use additional or alternative information to generate 1004 the one or more cluster identifiers 656. For instance, the central unit 646 may use TCIs 632, UE identifiers (e.g., UE IDs) 676, channel condition information (e.g., RSRP 678 and/or CQI 680, etc.), rank or rankings 682 and/or other information. The cluster information 656 may indicate which cells/sectors should be clustered (e.g., which eNBs 618 should cooperate in communicating with one or more UEs 602).

The central unit 646 may transmit 1006 the one or more cluster identifiers 656 to the one or more eNBs 618. For example, the central unit 646 may transmit a cluster message 603 including the one or more cluster identifiers 656 to one or more eNBs 618. In some configurations, the eNB 618 may encode and/or map cluster identifiers 656 for each cell/sector of an eNB 618 into a message (e.g., an eNB-CLI message 615) that is transmitted 1006. In some configurations, the cluster identifiers 656 that are transmitted may be different for each eNB 618. For instance, the central unit 646 may transmit only cluster identifiers 656 that are useful to a particular eNB 618. More specifically, the central unit 646 may transmit only cluster identifiers 656 to an eNB 618 concerning clustering related to those cells/sectors that the eNB 618 controls or provides. In another configuration, the central unit 646 may (globally) transmit the same cluster identifiers 656 (e.g., same CLI messages 603) to all of the eNBs 618 (in a top-cluster, for example).

A more detailed example of the systems and methods disclosed herein is given hereafter. The systems and methods herein may allow self-organizing adaptive clustering for cooperative multipoint transmissions. Using Coordinated Multipoint (CoMP) communications is one way to improve performance of cellular wireless systems (e.g., LTE Advanced) by cooperation of cells for reducing interference and increasing Signal-to-Interference-plus-Noise Ratio (SINR) of user equipments (UEs) 602 in weak radio conditions (e.g., located at a cell edge). One example is given herein of an adaptive clustering algorithm to dynamically adjust the cooperation sets of a CoMP system to the UE 602 perceived signal strength in order to maximize the overall system performance while avoiding major system architecture modifications. Additional gain in SINR may be achieved compared to non-UE-aware fixed clustering with a limited increase in system complexity for a practical adaptive CoMP clustering scheme performing not far from an upper bound UE-specific scheme.

Coordinated Multipoint (CoMP) communication is a technique to significantly enhance spectral efficiency and cell edge throughput, which may be applied to LTE-Advanced (LTE-A) 3GPP systems. It is based on the principle of coordinating downlink transmissions among different cells in order to improve the SINR of UEs 602 in weak radio conditions, thus reducing interference. CoMP communications may require additional signaling overhead on the air interface and the backhaul in case of inter-base station (e.g., eNB 618) cooperation.

In practice, only a limited number of base stations (e.g., eNBs 618) may cooperate in order to keep the overhead manageable. This raises the question of which base stations (e.g., eNBs 618) shall cooperate with each other and shall form clusters in order to exploit the advantages of CoMP efficiently at limited complexity. Principally, clustering may be distinguished between static and dynamic clustering algorithms. Static clusters are usually kept constant over time and built based on geographical criteria as the positions of the base stations. In the case of dynamic clustering, the system can continuously adapt to changing constraints such as user equipment (UE 602) positions and radio frequency (RF) conditions. This imposes the problem on which information the adaptation of the clusters shall be based upon. In practical LTE-A systems, a key requirement for any dynamic cluster algorithm is that it fit into the architecture of the radio access and/or the core network of LTE as described in 3GPP specifications. The 3GPP standard already offers a framework for self-organizing concepts to support automatic configuration and optimization of the network. The systems and methods disclosed herein may be used in adaptive mobile station (e.g., UE 602)-aware clustering. This example illustrates how it may be integrated into the existing network architecture and the self-organizing network (SON) concept of LTE.

This example is structured as follows. An adaptive clustering concept and details of the presented optimization problem and algorithm are presented. Then, simulation scenarios and simulation results for analyzed cases are presented. Finally, the example is summarized.

Adaptive clustering for Cooperative Multipoint (CoMP) provides the system with the ability to capture variations of the perceived radio environment and user locations in order to achieve better CoMP performance. In fact, due to the time-variant characteristics of the wireless channel, the variations of system loading and the mobility of the users, it is expected that a clustering algorithm able to adapt to such conditions will enable CoMP to perform better from a system point of view than a static clustering approach. In a static clustering approach, all cooperative sets are pre-defined based on proximity information and on network planning predictions.

For example, consider a group of Cooperative Multipoint (CoMP)-capable UEs 602 served by a cell (e.g., a "serving cell" or "scell") in a macro area where CoMP functionalities are available (e.g., the "top cluster"). These UEs 602 will report radio quality measurements to the serving cell (scell), which can thus collect statistics of radio frequency (RF) measurements and further elaborate them for cooperative multipoint (CoMP) clustering purposes. One option for collecting UE 602 inputs is to make use of existing measurements. For example, extracting data from measurement report messages (MRMs) in terms of averaged reference signal received power (RSRP) 668 of the cells measured by a UE 602.

Considering a generic UE 602 report, the list of cells measured can be identified as j-th set $S_j=\{\text{cell-1, cell-2}, \ldots, \text{cell-k}\}$, where, for example, only the cells stronger than a certain configurable threshold are considered forming the set, reported in any arbitrary order. The serving cell (scell) collects several of such reported sets from different terminals (e.g., UEs 602) over the selected observation period and summarizes them as statistical properties of the reported radio conditions. In each serving cell, the reported information can be represented by a list of pairs $[S_j, N_j]$, where $N_j \geq 1$ is the number of occurrences the set $S_j$ has been reported by all reporting UEs 602 during an observation period. The idea behind $[S_j, N_j]$ is that cell combinations that have been observed very often offer a higher potential to improve the system performance for several users when a cooperative multipoint (CoMP) scheme is adopted. This information is eventually collected in a cooperative multipoint (CoMP) central unit 646 associated with the considered top cluster, which computes the cell clusters in an adaptive manner by optimizing pre-defined objectives. At each observation period, information is collected at the central unit 646 and passed to an optimization algorithm that adapts the cell clustering and redistributes back the new sets to all base stations (e.g., eNBs 618) in the top cluster.

In the LTE system architecture, the central unit 646 may be located in a self-organizing network (SON) server of the operation and maintenance (OAM) function of the LTE system. The self-organizing network (SON) automatic neighbor relation (ANR) concept of the LTE system may be extended to support adaptive clustering as well.

To demonstrate the effectiveness of the concept, the optimization problem may be formalized with the help of classical linear programming notations. Let G(V,E) be a graph described by vertexes V and edges E associated to a cooperative multipoint (CoMP) top cluster, where vertexes are mapped into cells $v \subseteq V$ and edges $e \subseteq E$ are mapped into established interconnections (e.g., over an X2 interface 688) among them. Let $\gamma_j$ be a generic set of cells in the top cluster, among all possible sets $\Gamma_G$ in G. To each set $\gamma_j$ there is an associated cost $c_j$ and a cardinality $k_j$ (e.g., the number of cells belonging to the set). A set $\gamma_j$ is admitted to the final solution of the optimization problem if and only if $K_{min} \leq k_j \leq K_{max}$, where the minimum and maximum dimension of an admitted cluster is parameterized. Representing with $R_G \in \Gamma_G$ all admitted sets for the top cluster G, it is possible to introduce the characteristic matrix A and the decision variable $x_j$ defined as illustrated in Equations (1) and (2).

$$a_{kj} = \begin{cases} 1 & \text{if cell } k \in \gamma_j \\ 0 & \text{otherwise} \end{cases} \quad (1)$$

$$x_j = \begin{cases} 1 & \text{if } \gamma_j \text{ belongs to final solution} \\ 0 & \text{otherwise} \end{cases} \quad (2)$$

Equation (1) identifies how sets are composed while Equation (2) identifies what sets belong to the final solution. $a_{kj}$ are elements of the characteristic matrix A. The optimization problem can be then described as illustrated in Equations (3), (4) and (5).

$$\min \sum_{\gamma_j \in R_G} c_j x_j \text{ such that} \quad (3)$$

$$\sum_{\gamma_j \in R_G} a_{kj} x_j \geq 1 \ \forall \ v_k \in V \quad (4)$$

$$x_j \in \{0, 1\} \ \forall \ \gamma_j \in R_G \quad (5)$$

Equation (3) captures the optimization objective of minimizing the overall costs, under the constraints of having each cell in the top cluster belonging to at least one cooperative multipoint (CoMP) cluster illustrated in Equation (4) and imposing the solution to be an integer as illustrated in Equation (5).

This optimization problem belongs to known set covering and set partitioning class of combinatorial optimization problems, which are typically difficult to solve. Constraints can also be further refined, for example, by imposing equality in Equation (4) for disjoint clusters, or $K_{min} = K_{max}$ for equal size of all clusters.

One of the key factors to define an appropriate optimization problem is the selection of the cost function $c_j$. Looking at the cooperative multipoint (CoMP) functionality, a trade-off between system complexity and performance could, for example, be selected by making the cost proportional to the cluster cardinality $k_j$ or number of required X2 interfaces (large clusters increase system complexity) and inversely proportional to the combined radio conditions of the cluster cells (better radio conditions means higher performance).

In order to account for the number of user terminals that would benefit by a certain cluster $S_j$, a term inversely proportional to $N_j$ (the larger $N_j$ is, the larger is the number of users benefiting from cooperative multipoint (CoMP), hence the smaller the cost $c_j$), is added as illustrated in Equation (6). $N_j \geq 1$ is the number of occurrences that the set $S_j$ has been reported by all reporting UEs 602 during a period T.

$$c_j \propto \frac{k_j}{\sum_{k \in S_j} RSRP_k 10^{N_j}} \quad (6)$$

In Equation (6), $RSRP_k$ is the average in linear units of the overall reported measurements of cell k and the sum captures the combined radio conditions of the set $\gamma_j$ as an estimate of the cooperative multipoint (CoMP) performance potential of that cluster. The cost function illustrated in Equation (6) is an example based on above heuristic considerations. This cost function was used in simulative analysis as described below.

To solve the optimization problem above, different techniques can be explored. One approach used here is a technique comprising of the following steps. First, generate all admitted sets $\gamma_j \in R_G$ according to cardinality constraints, in an exhaustive way. This is possible as the computational complexity, which grows exponentially with the number of cells and neighbor relations, remains small in practical cases for top clusters of 30-40 cells with $K_{max}$ limited to a few cells. Second, associate to each set $\gamma_j$ its cost $c_j$ according to Equation (6). Third, create an initial optimization solution by adding the sets in increasing cost order until all cells are included in the final solution or there are no more candidate sets available. A modified version may be needed in case of disjoint sets (set partitioning), as at each step the sets overlapping with the ones already put in the solution may be removed from the candidate list. The process stops when all cells are covered or the candidate list is empty. Fourth, improve the solution, by step-wise replacing two (or more) sets with one not included, whose cost is lower than the sum of the costs of the replaced sets. This is one way to decrease the overall cost, as the initial solution was built selecting sets in cost-increasing order.

In order to evaluate the performance of the adaptive clustering principle, system level simulations were run employing a hexagonal network layout. A 3GPP reference network layout was configured with 19 3-sector sites of 500 meter (m) inter-site distance. Each of the 57 sectors was equipped with two antennas with a 15 degree down-tilt. The typical 3GPP urban macro spatial channel model as defined in 3GPP specifications in the 2 gigahertz (GHz) band was used in its extended version. The sectors were numbered from 0 to 56 in a counter-clockwise manner, starting from the center site and increasing with each tier. A number of 100 UEs were placed at random locations within each of four hotspot areas. UEs were simulated with two antennas moving at a speed of 3 km/h. A signal bandwidth of 5 megahertz (MHz) was used and the maximum transmit power per sector was set to 43 decibels referenced to 1 milliwatt (dBm) per 5 MHz.

Simulation results were obtained of the applied clustering algorithm which was configured to obtain the optimal solution for a disjoint set of clusters with up to three sectors using a shadow fading standard deviation of 2 dB. For two circular type UE hotspots, the closest three sectors from three different sites were selected. For the other two line type hotspots, the three geographically closest sectors in the middle of an area as well as the adjacent sectors (each belonging to a different site) were selected.

In order to assess the performance of the adaptive clustering algorithm, network simulations were run with calculated cluster sets. As a metric to evaluate the performance of the adaptive clustering algorithm, the improvement in geometry was chosen. The geometry of a UE served by a cooperative multipoint (CoMP) cluster $\gamma$ can be calculated as wideband SINR in an orthogonal frequency-division multiplexing (OFDM)-based system like LTE as illustrated in Equation (7).

$$SINR_i^\gamma = \frac{\sum_{k \in \gamma} P_{i,k}}{\sum_{k \in (V \setminus \gamma)} P_{i,k} = \sigma^2} \quad (7)$$

Equation (7) illustrates SINR, where $P_{i,k}$ is the received power (expressed in linear units) of $UE_i$ from cell k and $\sigma^2$ is the noise variance (where i is a UE number or index). In Equation (7), V is the set of all cells in the top cluster. $V \setminus \gamma$ is the set of all cells that do not belong to the cell cluster $\gamma$. The received powers $P_{i,k}$ are long-term average values without fading impacts. It is seen from equation (7) that cooperative multipoint (CoMP) applied in a cluster $\gamma$ improves the geometry compared to LTE Release 8 since the mobile is now served from multiple cells and interference is reduced accordingly.

The cumulative density function (CDF) of UE geometries obtained for the calculated cooperative multipoint (CoMP) clusters using 2 and 8 decibel (dB) shadow fading standard deviation are compared to the corresponding geometries if the UE is served by one cell only. While a shadow fading with 8 dB standard deviation represents the default value for outdoor scenarios, a standard deviation of 2 dB is selected for indoor scenarios. It was seen that for 50% of the observed geometries, the CoMP clustering algorithm resulted in a 6 dB better geometry environment.

Though the cumulative density function (CDF) may show the geometry statistics of all UEs, the curves may not reflect the effective improvement perceived by individual UEs (i.e., the improvement that UEs at the very same position in the network will experience).

Cumulative density functions (CDFs) of the geometry gains observed by individual UEs (i.e., the distribution statistics of the geometry difference seen by UEs located at the very same position in the network) were computed. The results showed that for the outdoor case with 8 dB shadow fading standard deviation, the cooperative multipoint (CoMP) cluster described above achieved a median geometry improvement of 3.5 dB for an individual UE, whereas for the indoor case, the reduced standard deviation of 2 dB leads to an even higher median gain of 5.7 dB.

One complexity aspect of the adaptive clustering algorithm compared to a pre-defined (fixed) network cluster is the need for an additional control entity in the network and the increased signaling overhead to estimate a good set of clusters. Such additional expenditure may only be justified if gains compared to the fixed clustering can be achieved. In order to evaluate the performance improvement of the adaptive algorithm, simulations were run and results were compared with a fixed cluster.

The selection of the fixed cluster was done based on empirical proximity layout considerations, where each sector of a cluster belongs to a different site. A wrap-around mechanism was used to assign sectors at the borders of the macro cluster. The results showed that, using radio channel-aware adaptive clustering, 32% (60%) of the UEs experience a performance improvement, 66% (30%) experience the same performance in terms of geometry gain for 8 dB (2 dB) shadow fading standard deviation, respectively.

The optimization algorithm for the adaptive CoMP clustering considers all UEs observed and selects a set of clusters under the given constraints (e.g., number of sectors per clusters, disjoint sets, etc.) in order to optimize the performance for the majority of UEs. However, some UEs may not experience an improvement if compared with a different cluster set selection depending on their location and the standard deviation of the shadow fading. Herewith, UEs located in areas between sectors not belonging to the same cluster can be affected.

The presented adaptive clustering algorithm is UE-aware but not UE-specific in the sense that the cluster selection is not done for each UE separately. On the other side, the optimal gain should be achievable as soon as the clusters are selected individually for each UE. However, this would come with the drawback that the clustering needs to be controlled for each UE separately and thus would significantly increase the required signaling amount and the overall system complexity, which in turn would have an impact on the system capacity.

Nevertheless, it is of interest to investigate how large the performance loss of the UE-aware adaptive clustering is compared to an optimal UE-specific clustering. Again, the geometry as defined in Equation (7) was chosen as a performance metric. Possible performance improvements were found by comparing the adaptive cluster described above with the optimal cluster selection for each individual UE employing a maximum set size of three. According to the simulation, in the 2 dB shadow fading case, 30% of the UEs experienced an improvement, where 10% perceived more than 3 dB geometry gain. For 8 dB shadow fading standard deviation, 64% of the UEs enjoyed better performance and 10% benefit even from a 5 dB geometry gain.

The presented results have been achieved based on the cost function presented previously. During the investigations it turned out that the cluster adaptation is (and thus performance gains are) quite sensitive to changes in the cost function.

It should further be noted that the antenna pattern model chosen for simulation has a strong backlobe component, which has a significant impact on the footprint of the sector and therefore impacts clustering. More realistic antenna patterns may be considered. Another aspect to be mentioned is the modeling of shadow fading in the spatial channel model. Shadow fading is modeled as being spatially uncorrelated in the spatial channel model (SCM). A more realistic model may take a correlation of the shadow fading over distance into account. This missing correlation impacts the presented results as well, since UEs being located next to each other can measure very different reference signal received power (RSRP) values from the same cells. Taking a spatial correlation of shadow fading into account, it becomes more likely that closely located UEs report similar sets of cells $S_j$, which should improve the reliability of the adaptive clustering algorithm.

An adaptive clustering algorithm to identify cooperating base stations for cooperative multipoint (CoMP) was analyzed. The algorithm is based on radio channel measurements of the mobile stations that are already supported in LTE Release 8. Performance gains were validated by means of simulations. The results show significant geometry improvements over LTE Release 8, which indicate the capabilities of cooperative multipoint (CoMP) for LTE. Additionally, the adaptive clustering algorithm was compared with static clustering.

With adaptive clustering, up to 70% of all mobile stations experienced geometry gains in the example compared to the case when the clusters of the cooperating base stations (e.g., eNBs) are statically defined based on geographic information only. This indicates the benefits of adaptive clustering. However, the investigations revealed that the performance of adaptive clustering is sensitive to the choice of the cost function.

Figure 11:
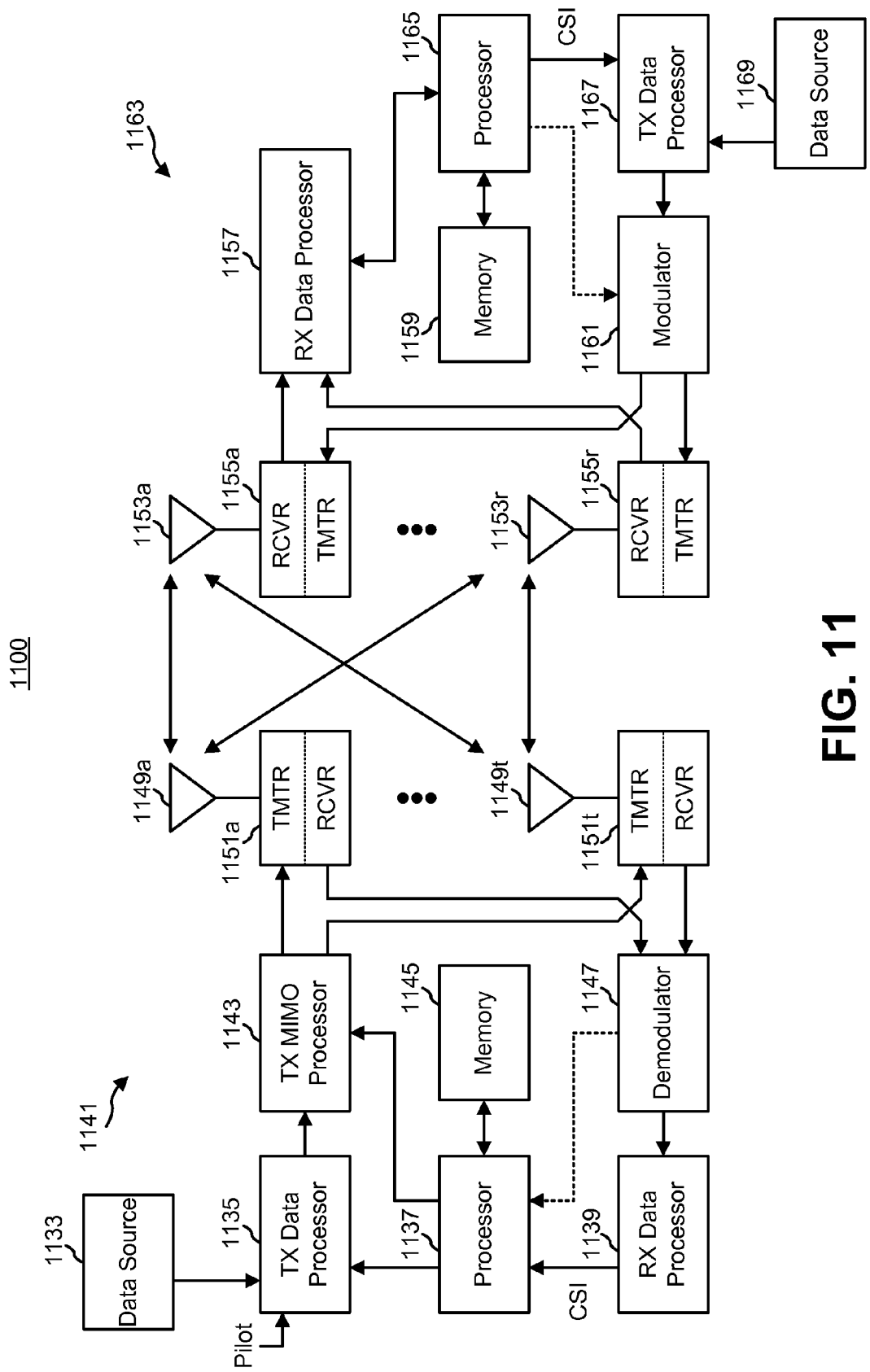
FIG. 11 is a block diagram of a transmitter and receiver in a multiple-input and multiple-output (MIMO) system.

FIG. 11 is a block diagram of a transmitter 1141 and receiver 1163 in a multiple-input and multiple-output (MIMO) system 1100. Examples of transmitters 1141 may include wireless communication devices 102, base stations 118 and/or an electronic device 146. Additionally or alternatively, examples of receivers 1163 may include wireless communication devices 102, base stations 118 and/or an electronic device 146. In the transmitter 1141, traffic data for a number of data streams is provided from a data source 1133 to a transmit (TX) data processor 1135. Each data stream may then be transmitted over a respective transmit antenna 1149a-t. The transmit (TX) data processor 1135 may format, code, and interleave the traffic data for each data stream based on a particular coding scheme selected for that data stream to provide coded data.

The coded data for each data stream may be multiplexed with pilot data (e.g., reference signals) using orthogonal frequency-division multiplexing (OFDM) techniques. The pilot data may be a known data pattern that is processed in a known manner and used at the receiver 1163 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 1143, which may further process the modulation symbols (e.g., for OFDM). The transmit (TX) multiple-input multiple-output (MIMO) processor 1143 then provides NT modulation symbol streams to NT transmitters (TMTR) 1151a through 1151t. The TX transmit (TX) multiple-input multiple-output (MIMO) processor 1143 may apply beamforming weights to the symbols of the data streams and to the antenna 1149 from which the symbol is being transmitted.

Each transmitter 1151 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 1151a through 1151t are then transmitted from NT antennas 1149a through 1149t, respectively.

At the receiver 1163, the transmitted modulated signals are received by NR antennas 1153a through 1153r and the received signal from each antenna 1153 is provided to a respective receiver (RCVR) 1155a through 1155r. Each receiver 1155 may condition (e.g., filter, amplify, and downconvert) a respective received signal, digitize the conditioned signal to provide samples, and further process the samples to provide a corresponding "received" symbol stream.

An RX data processor 1157 then receives and processes the NR received symbol streams from NR receivers 1155 based on a particular receiver processing technique to provide NT "detected" symbol streams. The RX data processor 1157 then demodulates, deinterleaves and decodes each detected symbol stream to recover the traffic data for the data stream. The processing by RX data processor 1157 may be complementary to that performed by TX MIMO processor 1143 and TX data processor 1135 at transmitter system 1141.

A processor 1165 may periodically determine which pre-coding matrix to use. The processor 1165 may store information on and retrieve information from memory 1159. The processor 1165 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 1167, which also receives traffic data for a number of data streams from a data source 1169, modulated by a modulator 1161, conditioned by transmitters 1155a through 1155r, and transmitted back to the transmitter 1141.

At the transmitter 1141, the modulated signals from the receiver are received by antennas 1149, conditioned by receivers 1151, demodulated by a demodulator 1147, and processed by an RX data processor 1139 to extract the reverse link message transmitted by the receiver system 1163. A processor 1137 may receive channel state information (CSI) from the RX data processor 1139. The processor 1137 may store information on and retrieve information from memory 1145. The processor 1137 then determines which pre-coding matrix to use for determining the beamforming weights and then processes the extracted message. The base stations 118, 218 and/or eNBs 618, 718 discussed above may be configured similarly to the transmitter 1141 illustrated in FIG. 11. The one or more wireless communication devices 102, 202 and/or the one or more UEs 602, 702 discussed above may be configured similarly to the receiver 1163 illustrated in FIG. 11.

Figure 12:
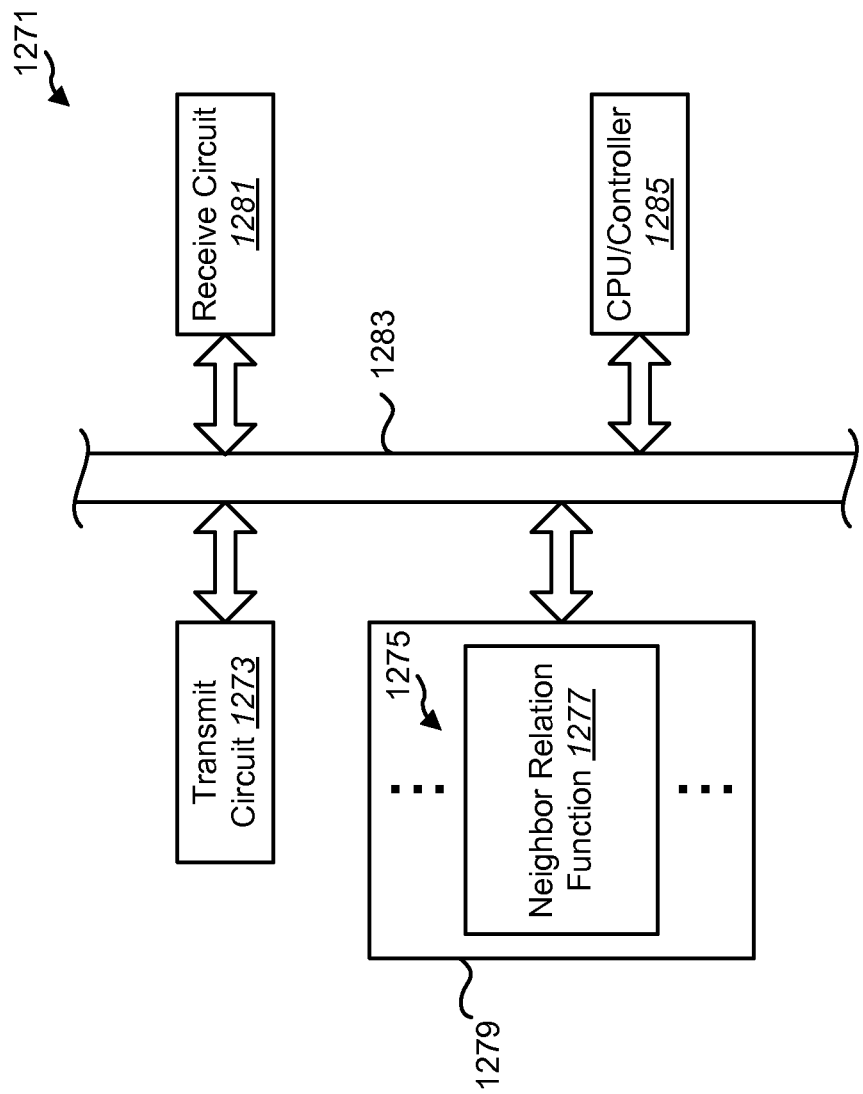
FIG. 12 shows part of a hardware implementation of an apparatus for executing the neighbor relation methods described herein.

FIG. 12 shows part of an exemplary hardware implementation of an apparatus 1271 for executing the schemes or processes as described above. The apparatus 1271 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 12.

In this embodiment, the circuit apparatus is signified by the reference numeral 1271 and can be implemented in any of the communication entities described herein, such as the base stations 118, 218 and/or the eNBs 618, 718.

The apparatus 1271 comprises a central data bus 1283 linking several circuits together. The circuits include a CPU (Central Processing Unit) or a controller 1285, a receive circuit 1281, a transmit circuit 1273, and a memory unit 1279.

If the apparatus 1271 is part of a wireless device, the receive circuit 1281 and the transmit circuit 1273 can be connected to an RF (Radio Frequency) circuit (which is not shown in the drawing). The receive circuit 1281 processes and buffers received signals before sending the signals out to the data bus 1283. On the other hand, the transmit circuit 1273 processes and buffers the data from the data bus 1283 before sending the data out of the device 1271. The CPU/controller 1285 performs the function of data management of the data bus 1283 and furthers the function of general data processing, including executing the instructional contents of the memory unit 1279.

The memory unit 1279 includes a set of modules and/or instructions generally signified by the reference numeral 1275. In this embodiment, the modules/instructions include, among other things, a neighbor relation function 1277 which carries out the schemes and processes as described above. The function 1277 includes computer instructions or code for executing the process steps as shown and described in FIGS. 1-4, 6-9 and/or 11. Specific instructions particular to an entity can be selectively implemented in the function 1277. For instance, if the apparatus 1271 is part of a base station 118, 218 or eNB 618, 718, among other things, instructions particular to the base station 118, 218 or eNB 618, 718, as shown and described in FIGS. 1-4, 6-9 and 11 can be coded in the function 1277.

In this embodiment, the memory unit 1279 is a RAM (Random Access Memory) circuit. The exemplary functions, such as the function 1277, include one or more software routines, modules and/or data sets. The memory unit 1279 can be tied to another memory circuit (not shown) which can either be of the volatile or nonvolatile type. As an alternative, the memory unit 1279 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

Figure 13:
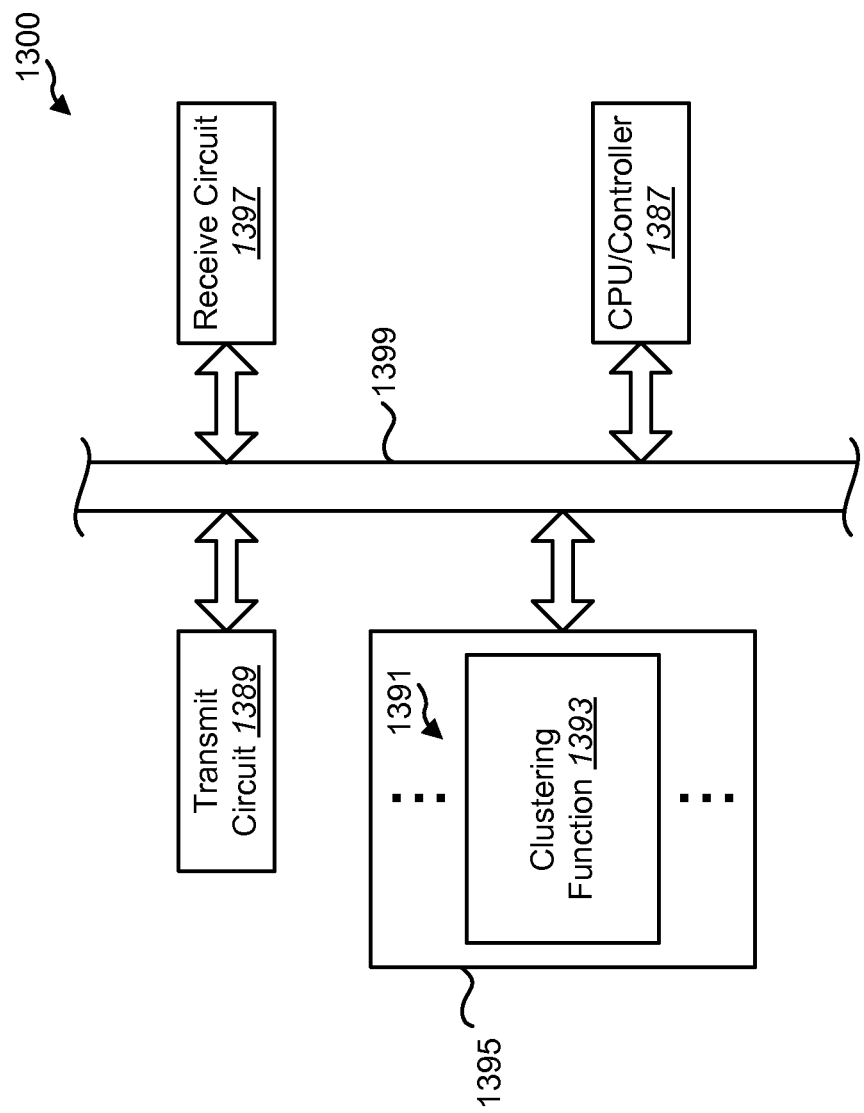
FIG. 13 shows part of a hardware implementation of an apparatus for executing the clustering methods described herein.

FIG. 13 shows part of an exemplary hardware implementation of an apparatus 1300 for executing the schemes or processes as described above. The apparatus 1300 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 13.

In this embodiment, the circuit apparatus is signified by the reference numeral 1300 and can be implemented in any of the communication entities described herein, such as the electronic devices 146, 246 and/or the central units 646, 746.

The apparatus 1300 comprises a central data bus 1399 linking several circuits together. The circuits include a CPU (Central Processing Unit) or a controller 1387, a receive circuit 1397, a transmit circuit 1389 and a memory unit 1395.

If the apparatus 1300 is part of a wireless device, the receive circuit 1397 and the transmit circuit 1389 can be connected to an RF (Radio Frequency) circuit (which is not shown in the drawing). The receive circuit 1397 processes and buffers received signals before sending the signals out to the data bus 1399. On the other hand, the transmit circuit 1389 processes and buffers the data from the data bus 1399 before sending the data out of the device 1300. The CPU/controller 1387 performs the function of data management of the data bus 1399 and further the function of general data processing, including executing the instructional contents of the memory unit 1395.

The memory unit 1395 includes a set of modules and/or instructions generally signified by the reference numeral 1391. In this embodiment, the modules/instructions include, among other things, a clustering function 1393 which carries out the schemes and processes as described above. The function 1393 includes computer instructions or code for executing the process steps as shown and described in FIGS. 1-2, 5-7 and/or 10. Specific instructions particular to an entity can be selectively implemented in the function 1393. For instance, if the apparatus 1300 is part of an electronic device 146, 246 or central unit 646, 746, among other things, instructions particular to the electronic device 146, 246 or central unit 646, 746 as shown and described in FIGS. 1-2, 5-7 and 10 can be coded in the function 1393.

In this embodiment, the memory unit 1395 is a RAM (Random Access Memory) circuit. The exemplary functions, such as the function 1393, include one or more software routines, modules and/or data sets. The memory unit 1395 can be tied to another memory circuit (not shown) which can either be of the volatile or nonvolatile type. As an alternative, the memory unit 1395 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus operable in a communication system, comprising:
   means for receiving a neighbor relation message from a second apparatus, the neighbor relation message comprising neighbor cell information, the neighbor cell information indicating rankings, by the second apparatus, of other apparatuses configured to provide cells/sectors;
   means for determining a plurality of cells/sectors to form a cooperative multipoint cluster that is cell-specific based on the rankings indicated in the neighbor cell information, wherein the cooperative multipoint cluster includes a first cell/sector of the second apparatus and a second cell/sector of a third apparatus;
   means for generating cluster information, wherein the cluster information indicates the determined plurality of cells/sectors; and
   means for transmitting the cluster information to the second apparatus and the third apparatus such that the second apparatus and the third apparatus operate the first cell/sector and the second cell/sector cooperatively to communicate with a UE.

2. The apparatus of claim 1, wherein the neighbor relation message is based on cell information.

3. The apparatus of claim 1, wherein the neighbor relation message is based on extended information.

4. The apparatus of claim 1, wherein the neighbor relation message further comprises a wireless communication device identifier.

5. The apparatus of claim 1, wherein the apparatus is a central unit and the second apparatus is a base station.

6. The apparatus of claim 1, wherein the means for receiving the neighbor relation message and the means for transmitting the cluster information comprise one selected from the group consisting of a central unit interface and an S1 interface.

7. The apparatus of claim 1, wherein the cluster information is included in a cluster message.

8. The apparatus of claim 1, wherein the apparatus resides in a serving gateway.

9. The apparatus of claim 1, wherein the apparatus resides in a network manager.

10. The apparatus of claim 1, wherein the apparatus resides in an operations and maintenance block or module.

11. An apparatus, comprising:
    a memory; and
    at least one processor coupled to the memory and configured to:
        receive a neighbor relation message from a second apparatus, the neighbor relation message comprising neighbor cell information, the neighbor cell information indicating rankings, by the second apparatus, of other apparatuses configured to provide cells/sectors,
        determine a plurality of cells/sectors to form a cooperative multipoint cluster that is cell-specific based on the rankings indicated in the neighbor cell information, wherein the cooperative multipoint cluster includes a first cell/sector of the second apparatus and a second cell/sector of a third apparatus,
        generate cluster information, wherein the cluster information indicates the determined plurality of cells/sectors, and
        transmit the cluster information to the second apparatus and the third apparatus such that the second apparatus and the third apparatus operate the first cell/sector and the second cell/sector cooperatively communicate with a UE using the first cell/sector and the second cell/sector.

12. The apparatus of claim 11, wherein the neighbor relation message is based on cell information.

13. The apparatus of claim 11, wherein the neighbor relation message is based on extended information.

14. The apparatus of claim 11, wherein the neighbor relation message further comprises a wireless communication device identifier.

15. The apparatus of claim 11, wherein the apparatus is a central unit and the second apparatus is a base station.

16. The apparatus of claim 11, wherein the at least one processor configured to receive the neighbor relation message and to transmit the cluster information is to receive and transmit using one selected from the group consisting of a central unit interface and an S1 interface.

17. The apparatus of claim 11, wherein the cluster information is included in a cluster message.

18. The apparatus of claim 11, wherein the at least one processor resides in a serving gateway.

19. The apparatus of claim 11, wherein the at least one processor resides in a network manager.

20. The apparatus of claim 11, wherein the at least one processor resides in an operations and maintenance block or module.

21. A method operable by an apparatus, comprising:
    receiving, by the apparatus, a neighbor relation message from a second apparatus, the neighbor relation message comprising neighbor cell information, the neighbor cell information indicating rankings, by the second apparatus, of other apparatuses configured to provide cells/sectors;
    determining, by the apparatus, a plurality of cells/sectors to form a cooperative multipoint cluster that is cell-specific based on the rankings indicated in the neighbor cell information, wherein the cooperative multipoint cluster includes a first cell/sector of the second apparatus and a second cell/sector of a third apparatus;
    generating, by the apparatus, cluster information, wherein the cluster information indicates the determined plurality of cells/sectors; and
    transmitting the cluster information to the second apparatus and the third apparatus such that the second apparatus and the third apparatus operate the first cell/sector and the second cell/sector cooperatively to communicate with a UE.

22. The method of claim 21, wherein the neighbor relation message is based on cell information.

23. The method of claim 21, wherein the neighbor relation message is based on extended information.

24. The method of claim 23, wherein the neighbor relation message further comprises a wireless communication device identifier.

25. The method of claim 21, wherein the apparatus is a central unit and the second apparatus is a base station.

26. The method of claim 21, wherein receiving the neighbor relation message and transmitting the cluster information are performed using one selected from the group consisting of a central unit interface and an S1 interface.

27. The method of claim 21, wherein the cluster information is included in a cluster message.

28. The method of claim 21, wherein the apparatus resides in a serving gateway.

29. The method of claim 21, wherein the apparatus resides in a network manager.

30. The method of claim 21, wherein the apparatus resides in an operations and maintenance block or module.

31. A non-transitory computer-readable medium storing computer executable code, comprising code for:
  causing an apparatus to receive a neighbor relation message from a second apparatus, the neighbor relation message comprising neighbor cell information, the neighbor cell information indicating rankings, by the second apparatus, of other apparatuses configured to provide cells/sectors;
  causing the apparatus to determine a plurality of cells/sectors to form a cooperative multipoint cluster that is cell-specific based on the rankings indicated in the neighbor cell information, wherein the cooperative multipoint cluster includes a first cell/sector of the second apparatus and a second cell/sector of a third apparatus;
  causing the apparatus to generate cluster information, wherein the cluster information indicates the determined plurality of cells/sectors; and
  causing the apparatus to transmit the cluster information to the second apparatus and the third apparatus such that the second apparatus and the third apparatus operate the first cell/sector and the second cell/sector cooperatively to communicate with a UE.

32. The non-transitory computer-readable medium of claim 31, wherein the neighbor relation message is based on extended information.

33. The apparatus of claim 1, wherein the neighbor cell information includes target cell identifiers, channel quality indicators, and reference signal received power of more than one cell/sector.

34. The apparatus of claim 1, wherein the neighbor cell information includes indications of a set of neighbor cells and a number of occurrences the set of neighbor cells has been reported to the second apparatus by the at least two UEs.

* * * * *